United States Patent
Bagepalli et al.

(10) Patent No.: US 7,895,463 B2
(45) Date of Patent: Feb. 22, 2011

(54) REDUNDANT APPLICATION NETWORK APPLIANCES USING A LOW LATENCY LOSSLESS INTERCONNECT LINK

(75) Inventors: Nagaraj Bagepalli, San Jose, CA (US); Prashant Gandhi, San Jose, CA (US); Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/101,865

(22) Filed: Apr. 11, 2008

(65) Prior Publication Data

US 2009/0063893 A1    Mar. 5, 2009

Related U.S. Application Data

(60) Provisional application No. 60/966,649, filed on Aug. 28, 2007.

(51) Int. Cl.
G06F 11/00 (2006.01)
(52) U.S. Cl. .......................................... 714/4
(58) Field of Classification Search ...................... 714/4
See application file for complete search history.

(56) References Cited

U.S. PATENT DOCUMENTS

| | | | |
|---|---|---|---|
| 5,706,429 | A | 1/1998 | Lai et al. |
| 6,131,120 | A | 10/2000 | Reid |
| 6,205,480 | B1 | 3/2001 | Broadhurst et al. |
| 6,223,217 | B1 | 4/2001 | Pettus |
| 6,460,141 | B1 | 10/2002 | Olden |
| 6,594,712 | B1 | 7/2003 | Pettey et al. |
| 6,640,238 | B1 | 10/2003 | Bowman-Amuah |
| 6,658,469 | B1 | 12/2003 | Massa et al. |
| 6,675,200 | B1 | 1/2004 | Cheriton et al. |

(Continued)

FOREIGN PATENT DOCUMENTS

WO    WO 03/104943 A2    12/2003

(Continued)

OTHER PUBLICATIONS

International Search Report and Written Opinion mailed Feb. 2, 2009, for International Application No. PCT/US08/10080, 10 pages.

*Primary Examiner*—Scott T Baderman
*Assistant Examiner*—Yair Leibovich

(57) ABSTRACT

Redundant application network appliances using a low latency lossless interconnect link are described herein. According to one embodiment, in response to receiving at a first network element a packet of a network transaction from a client over a first network for accessing a server of a datacenter, a layer 2 network process is performed on the packet and a data stream is generated. The data stream is then replicated to a second network element via a layer 2 interconnect link to enable the second network element to perform higher layer processes on the data stream to obtain connection states of the network transaction. In response to a failure of the first network element, the second network element is configured to take over processes of the network transaction from the first network element using the obtained connection states without user interaction of the client. Other methods and apparatuses are also described.

24 Claims, 22 Drawing Sheets

U.S. PATENT DOCUMENTS

| | | |
|---|---|---|
| 6,728,884 B1 | 4/2004 | Lim |
| 6,754,829 B1 | 6/2004 | Butt et al. |
| 6,804,720 B1 | 10/2004 | Vilander et al. |
| 6,889,294 B1 | 5/2005 | Nichols et al. |
| 6,901,491 B2 | 5/2005 | Kohn et al. |
| 6,912,604 B1 | 6/2005 | Tzeng et al. |
| 6,922,724 B1 | 7/2005 | Freeman et al. |
| 6,947,984 B2 | 9/2005 | Schweitzer et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,180 B1 | 9/2006 | DeCaprio |
| 7,117,526 B1 | 10/2006 | Short |
| 7,146,635 B2 | 12/2006 | Eggebraaten et al. |
| 7,149,808 B2 | 12/2006 | Lu |
| 7,149,817 B2 | 12/2006 | Pettey |
| 7,149,892 B2 | 12/2006 | Freed et al. |
| 7,171,681 B1 | 1/2007 | Duncan et al. |
| 7,178,163 B2 | 2/2007 | Reeves, Jr. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 | 4/2007 | Acharya et al. |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,447,220 B2 | 11/2008 | Lu et al. |
| 7,633,955 B1 * | 12/2009 | Saraiya et al. ............. 370/401 |
| 2002/0107971 A1 | 8/2002 | Bailey et al. |
| 2002/0129271 A1 | 9/2002 | Stanaway, Jr. et al. |
| 2002/0199006 A1 | 12/2002 | Magnussen et al. |
| 2003/0005073 A1 | 1/2003 | Yoshizawa et al. |
| 2003/0043794 A1 | 3/2003 | Cayton et al. |
| 2003/0097454 A1 | 5/2003 | Yamakawa et al. |
| 2003/0097518 A1 | 5/2003 | Kohn et al. |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 * | 2/2004 | Pandya ................ 370/401 |
| 2004/0037319 A1 | 2/2004 | Pandya |
| 2004/0128398 A1 * | 7/2004 | Pettey ................ 709/249 |
| 2004/0128538 A1 | 7/2004 | Gmuender et al. |
| 2004/0139319 A1 | 7/2004 | Favazza et al. |
| 2004/0165588 A1 * | 8/2004 | Pandya ................ 370/389 |
| 2004/0199808 A1 * | 10/2004 | Freimuth et al. ............ 714/4 |
| 2004/0210320 A1 | 10/2004 | Pandya |
| 2004/0213284 A1 | 10/2004 | Clarke et al. |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 | 4/2006 | Liu |
| 2006/0075463 A1 | 4/2006 | Braddy et al. |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Aloni et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0171921 A1 | 7/2007 | Wookey et al. |
| 2007/0174429 A1 | 7/2007 | Mazzaferri et al. |
| 2007/0179955 A1 | 8/2007 | Croft et al. |
| 2007/0180088 A1 | 8/2007 | Zhao |
| 2007/0180447 A1 | 8/2007 | Mazzaferri et al. |
| 2007/0180493 A1 | 8/2007 | Croft et al. |
| 2007/0226750 A1 | 9/2007 | Sharp et al. |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

* cited by examiner

REDUNDANT APPLICATION NETWORK APPLIANCES USING A LOW LATENCY LOSSLESS INTERCONNECT LINK

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application network appliances. More particularly, this invention relates to redundant application network appliances using a low latency lossless interconnect link.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditional security products generally assume the existence of a trusted intranet—locations where enterprises control their own LANs, switches and routers—which can be organized into or placed within some type of security perimeter, to protect its resources from the un-trusted Internet. However, in today's business environment, enterprises no longer enjoy the same level of trust and control of their intranets, as enterprises increasingly rely on contractors, partners, consultants, vendors, and visitors on-site for daily operation. As a result, enterprises are exposing internal resources to this wide set of clients whose roles are also frequently changing. Thus, the network trust boundary, delineating inside and outside clients, is disappearing—a phenomenon referred to as "de-perimeterization". In such an environment, protection of an enterprise's resources—such as its intellectual property, as well as mission-critical and operational systems—becomes of critical importance. Also, most security exploits easily traverse perimeter security, as enterprises typically let through email, web and any encrypted network traffic, such as Secure Sockets Layer (SSL), Simple Mail Transfer Protocol (SMTP) with Transport Layer Security (TLS), and authenticated Virtual Private Network (VPN) traffic, for example via IP Security (IPSec). Traditional perimeter security approaches, for example firewalls, intrusion detection systems and intrusion prevention systems have little or no benefit at the perimeter in providing access control functions to the resources. They have become more attack mitigation mechanisms than access control mechanisms. Enterprises are coming to terms with the fact that a hardened perimeter strategy is un-sustainable.

Traditional firewall or router access control lists cannot protect application resources from unauthorized access because network parameters such as Internet Protocol (IP) addresses and IP port numbers no longer deterministically identify resources, nor identify users, clients, or applications accessing these resources. Network firewall technology was invented when enterprises had a limited set of applications such as Telnet, File Transfer Protocol (FTP), and Email, and its primary functions were to limit access to specific applications from the outside and to limit access by systems within the enterprise to specific applications outside the firewall. Network layer parameters such as source, destination IP address and TCP or UDP port numbers were sufficient to identify the client and the operations the clients intended to perform on a particular resource. However, with the proliferation of mobile devices and tunneled applications, the network layer parameters are no longer useful to identify the client, the resource accessed, and the operation. Firewalls have evolved over the time, embracing functions such as deep packet inspection and intrusion detection/prevention, to handle application-level attacks, but the core access control function remains the same.

In effect, de-perimeterization demands that access control functions are positioned close to application resources and that a micro-perimeter is established in the heart of the data center by placing an identity-based policy enforcement point in front of any application resource. Enterprise business drivers for such an enforcement point are the need for rich and uniform protection of resources, business agility via attribute-based, policy-driven provisioning, and regulatory compliance. Traditional server-centric authorization solutions providing role-based authorization often require custom code development, extensive cross-vendor testing whenever there is a version change (of the underlying operating system, agent or application), and are costly and difficult to maintain because of their proprietary nature. Also, traditional server-based network appliances—primarily focused on low-bandwidth ISO Layer-4 to ISO Layer-7 perimeter services—are unsuitable for data center deployment, both in functional richness and in ISO Layer-7 performance.

Network system reliability and availability is very important for enterprise networks. High-availability for network systems has two aspects, to minimize downtime of the network system, and to remain functional in spite of failures. High-availability is typically implemented by adding redundancy to a system. Two or more peers will perform the functionality together.

Traditionally a fault may cause the protocol stack processing to fail, which results in disconnecting the client. The resuming peer then reconnects the client, it determines which packets got lost and the lost data is then retransmitted. For many applications it is not acceptable to disconnect clients. Therefore, a so-called zero-click fail-over is important.

Architectures commonly used in other approaches to solving these problems have shown several difficulties: A system processor is involved in performing the data structure replication in creating and forwarding the data packet down and up the network stack during transmit and receive, which severely degrades the system throughput. The system processors may incur substantial overhead from copying data in memory as part of Input/Output (I/O) operations. Copying is necessary in order to align data, place data contiguously in memory, or place data in specific buffers supplied by the application. A reliable protocol must be implemented between the peers to prevent packet loss.

SUMMARY OF THE DESCRIPTION

Redundant application network appliances using a low latency lossless interconnect link are described herein. According to one embodiment, in response to receiving at a first network element a packet of a network transaction from a client over a first network for accessing a server of a datacenter having a plurality of servers over a second network, a layer 2 network process is performed on the packet and a data stream is generated within the first network element. The data stream is then replicated to a second network element via a layer 2 interconnect link to enable the second network element to perform higher layer processes on the data stream with respect to the network transaction to obtain connection states of the network transaction. The second network element is configured to operate as a redundant peer to the first network element, and in response to a failure of the first network element, the second network element is configured to take over processes of the network transaction from the first network element using the obtained connection states without user interaction of the client.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention is a system and method for High-Availability Networking by using a Lossless Data Transport Fabric with an ISO Layer-7 networking system which comprises multiple redundant modules and which copies state information from one module to another module via the Lossless Data Transport Fabric in order to enable transparent High Availability failover. This LDTF may be an RDMA-capable fabric, such as InfiniBand or iWARP.

Overview

Figure 2:
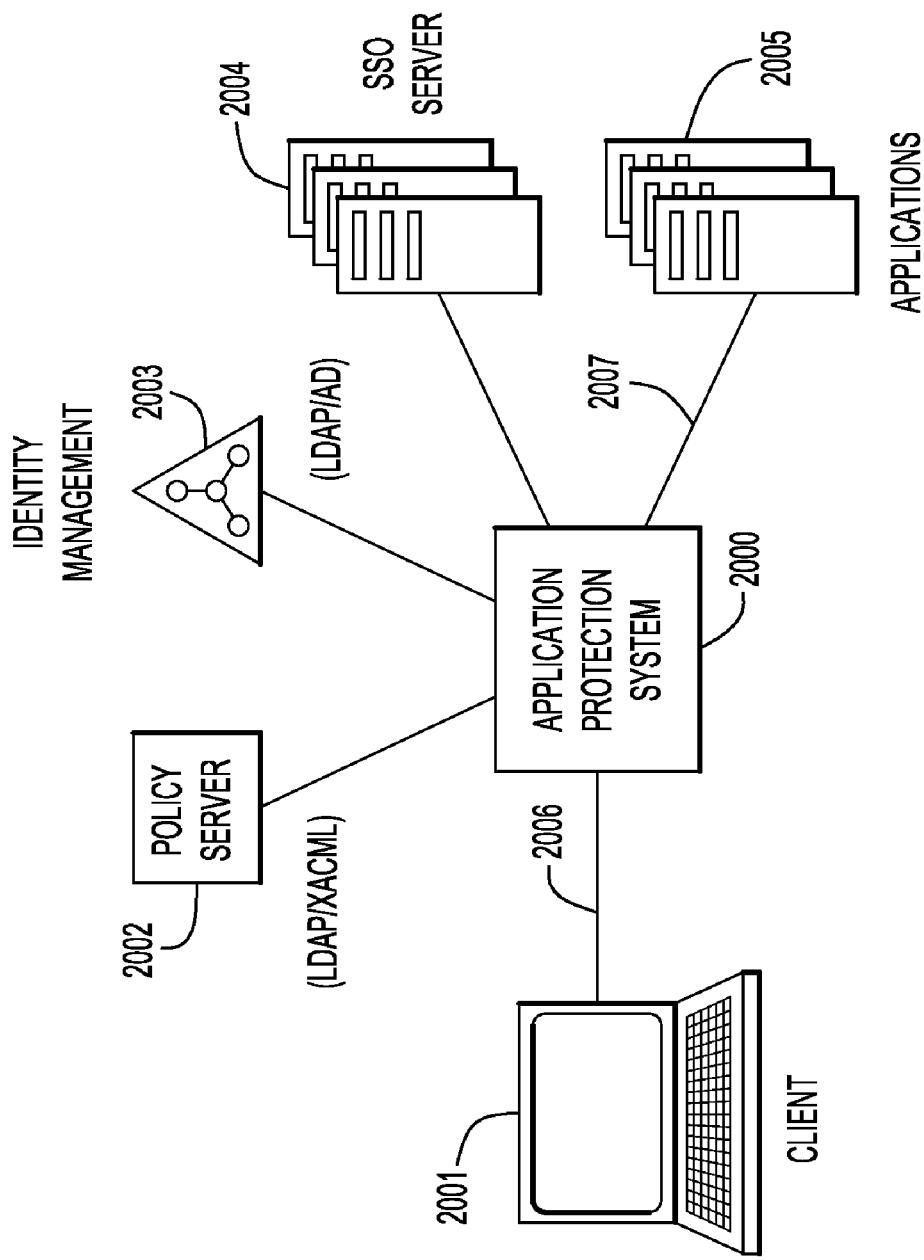
FIG. 2 illustrates the application of an application network appliance (ANA) as the APS according to one embodiment of the invention.

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

Figure 1:
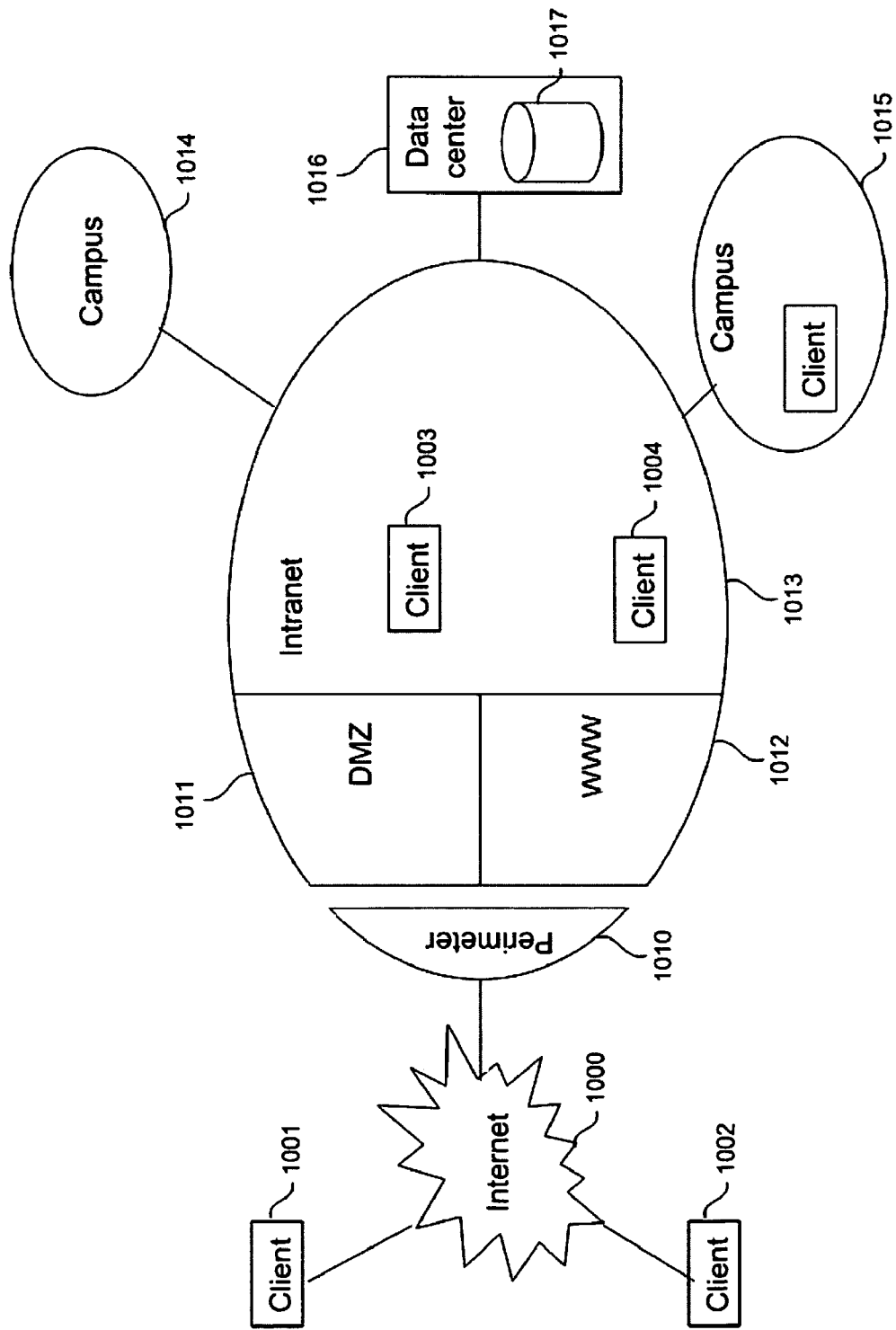
FIG. 1 illustrates a typical corporate computer network connected to the Internet.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

Figure 3:
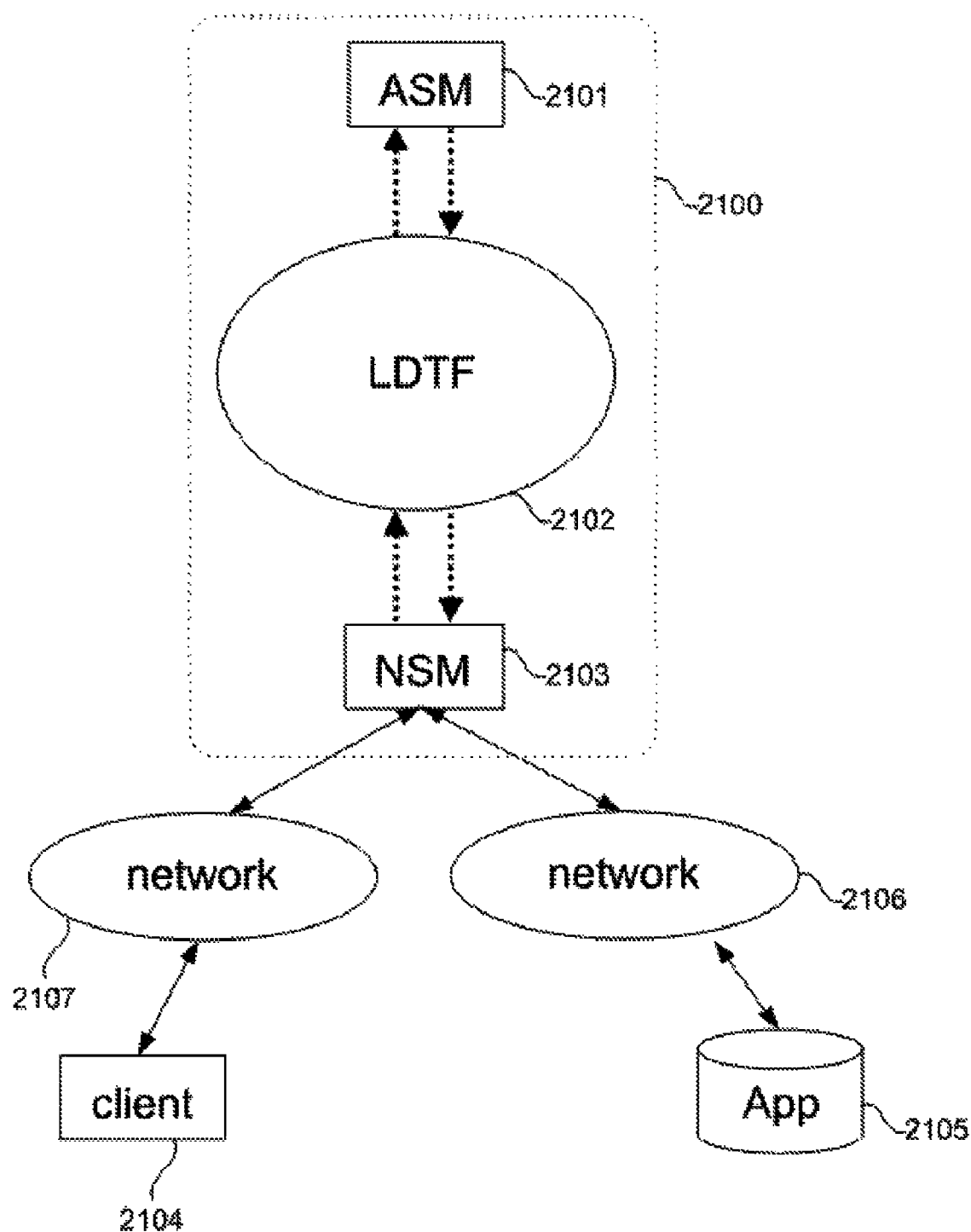
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

Use of RDMA to Provide High-Availability

Yet another benefit of the aforedescribed approach is that it can be used to build ANAs with high-availability and zero-click fail-over behavior. High-availability with zero-click fail-over can be achieved by having redundant peer ANAs maintain a consistent redundant state with other peer ANAs. This means that all relevant state information including the data stream information is replicated and synchronized among the redundant peer ANAs. When ANAs behave as a high-speed proxy, fault-tolerant transport protocol functionality is required, which includes maintaining an active backup transport protocol stack, and keeping track of states of the transport protocol connection. A redundant peer ANA which acts as a backup for another ANA is able to take over the other ANA's protocol connection completely transparent to clients. The primary ANA's and the backup ANA's transport protocol stack each see the same client-to-server stream which means that both the primary and the backup ANA independently process the transport protocol state but only the current primary ANA responds to client-server requests.

To facilitate state and data replication among redundant peer ANAs it is important that peer ANAs have visibility into their peers' memory. A lossless, low-latency, high-bandwidth, RDMA-capable interconnect fabric can also be used for visibility into peer memory.

Figure 4:
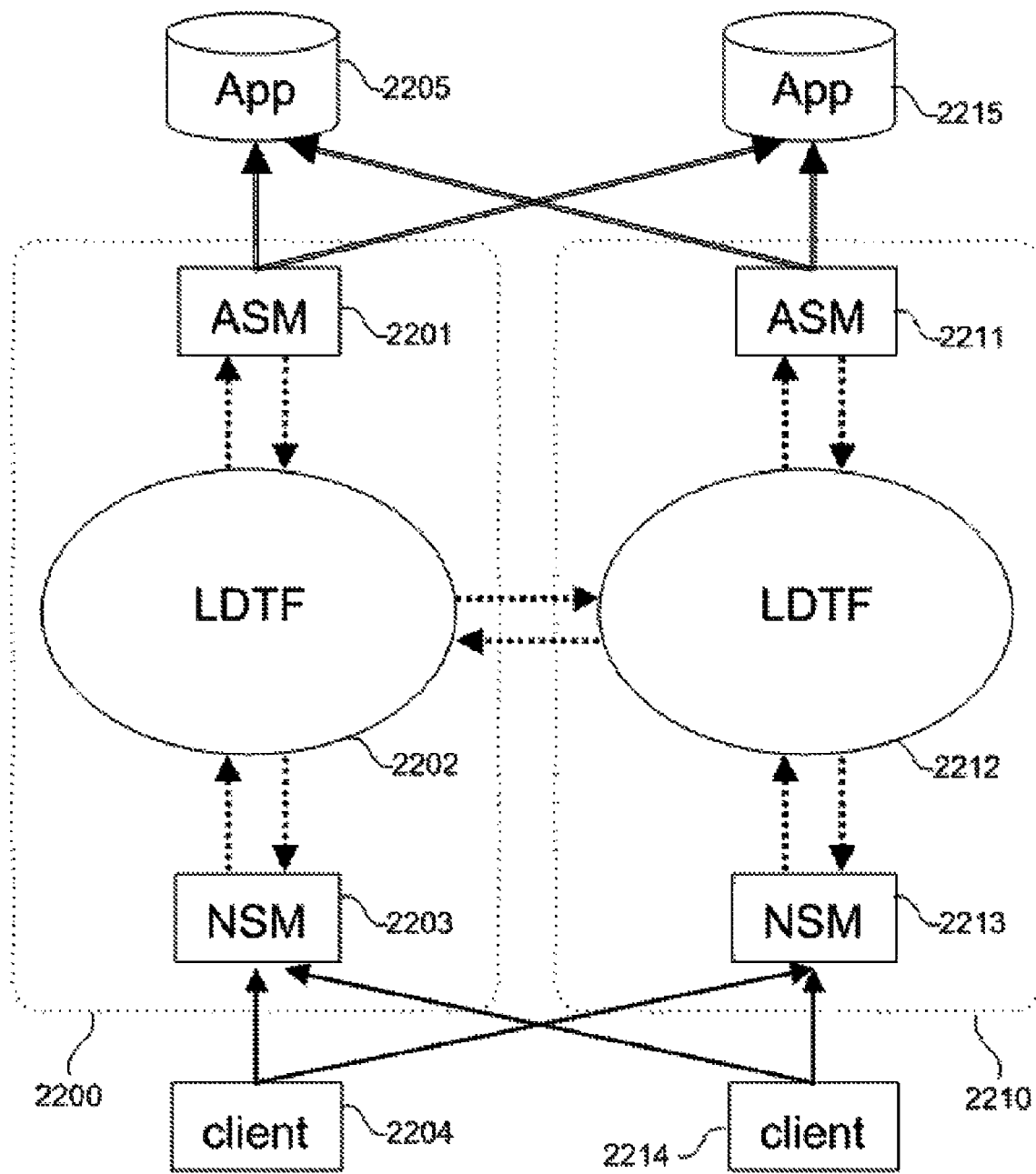
FIG. 4 is a block diagram which illustrates scalability of a ANA via multiple ANAs according to one embodiment of the invention.

FIG. 4 shows how peer memory visibility through LDTF can be achieved. In this case there are two ANAs, ANA 2200, which is dedicated to client 2204 and application server 2205, and ANA 2210, which is dedicated to client 2214 and application server 2215. High-availability can be achieved by having ANA 2200 be the backup for ANA 2210 whenever ANA 2210 fails such that ANA 2200 will also service client 2214 and application server 2215, and by having ANA 2210 be the backup for ANA 2200, similarly. Both ANAs 2200 and 2210 can be connected via an inter-chassis or inter-module RDMA-capable interconnect link. This link can be seen as an extension of the internal LDTF 2202 and 2212.

Each ANA ensures state redundancy its peer ANA(s). In one embodiment of the invention, NSM 2203 performs Network Service processing for client 2204 and consistently does stream replication via LDTF 2202 and LDTF 2212 to update its redundant state data in its peer's NSM 2213, and vice versa. Similarly, ASM 2201 performs ISO Layer-7 processing for application server 2205 and then replicates its ISO Layer-7 state information by updating its redundant state data in its peer's ASM 2211 via writing through LDTF 2202 and LDTF 2212 into its peer's state memory.

Figure 5:
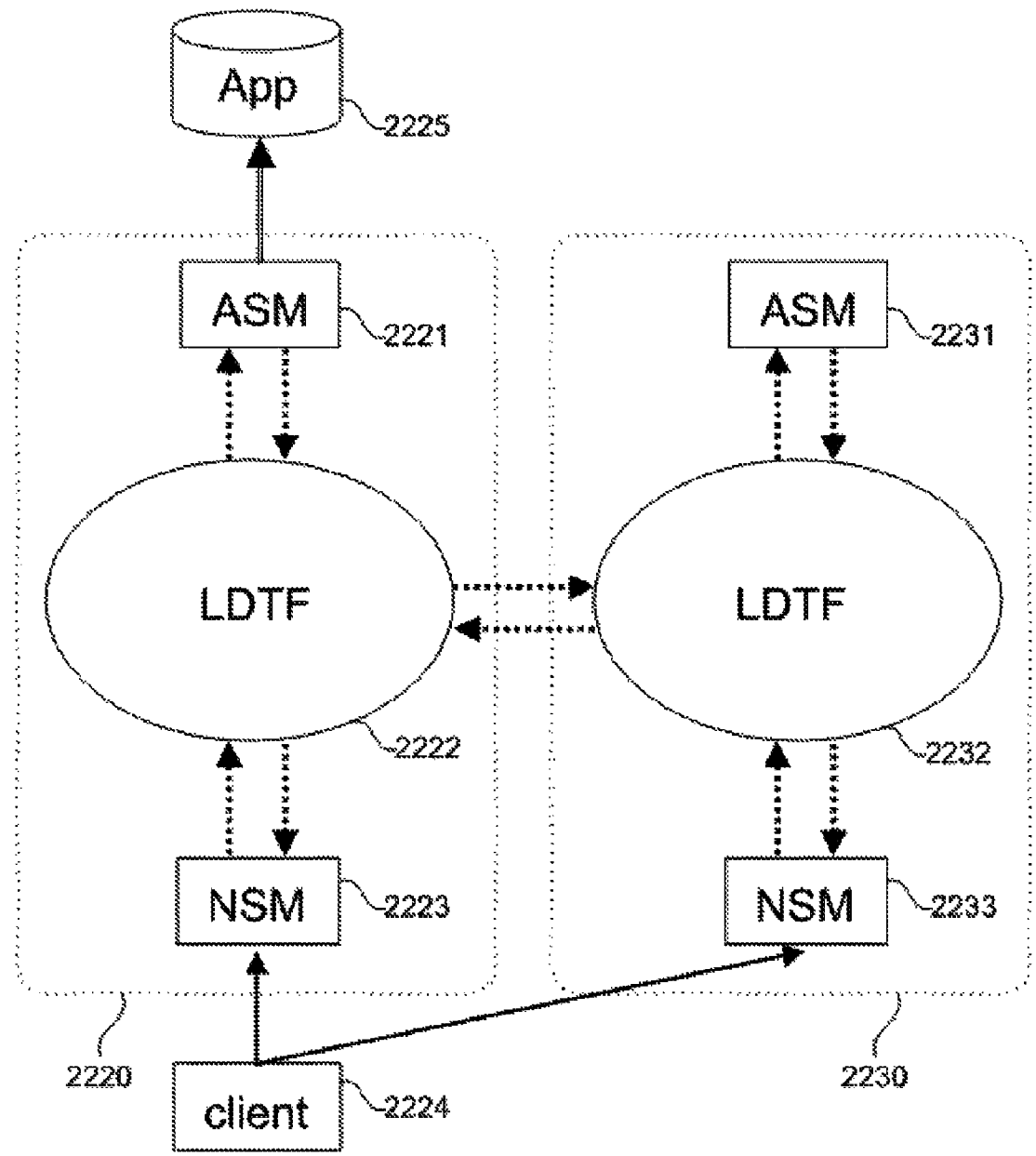
FIG. 5 is a block diagram which illustrates scalability of an ANA via multiple ANAs according to another embodiment of the invention.

FIG. 5 shows how an ANA 2220, which services a client 2224, and an application server 2225, is complemented with a backup ANA 2230. Both ANAs 2220 and 2230 can be connected via an inter-chassis or inter-module RDMA-capable interconnect link. This link can be seen as an extension of the internal LDTF 2222 and 2232. The ANA 2220 will ensure state redundancy in the backup ANA 2230. In one embodiment of the invention, NSM 2223 performs Network Service processing for client 2224 and consistently does stream replication via LDTF 2222 and LDTF 2232 to update its redundant state data in its backup's NSM 2233. Similarly, ASM 2221 performs ISO Layer-7 processing for application server 2225 and then replicates its ISO Layer-7 state information by updating its redundant state data in its backup's ASM 2231 via writing through LDTF 2222 and LDTF 2232 into its backup's state memory.

Figure 6:
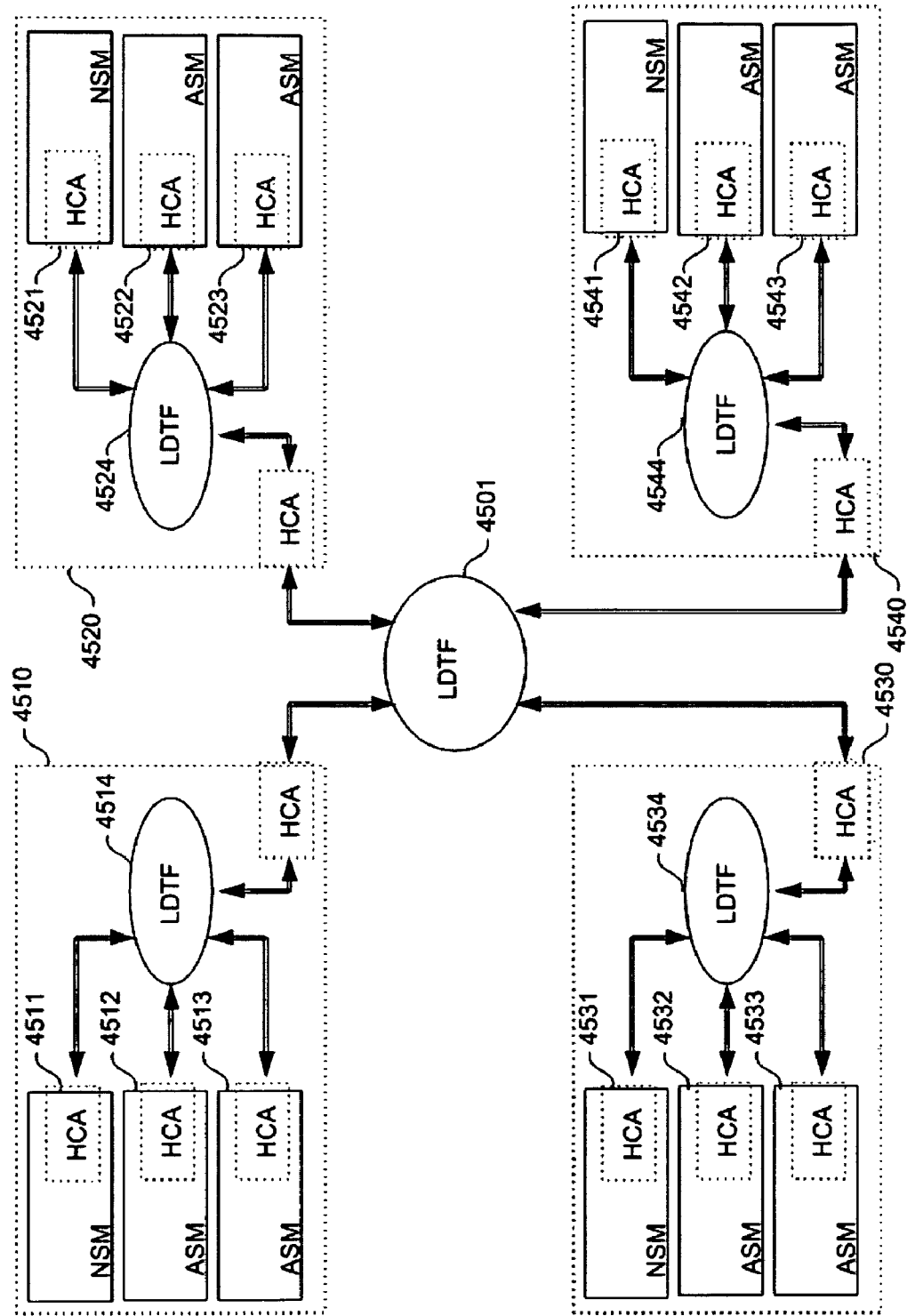
FIG. 6 is a block diagram of a high-availability system setup for an ANA according to one embodiment of the invention.

More than two ANAs such as the two ANAs 2200 and 2210 in FIG. 4 or ANAs 2220 and 2230 in FIG. 5 can be used to increase an enterprise network's reliability and availability even further. This is shown in FIG. 6 where in one exemplary setup four ANAs, 4510, 4520, 4530, 4540 are used in combination to provide scalability for high bandwidth performance as well as high-availability via redundancy. Each ANA itself provides a scalable and highly-available setup. For example, ANA 4510 comprises one NSM 4511 and two ASMs 4512 and 4513, all connected via LDTF 4514. For example, ANA 4520 comprises one NSM 4521 and two ASMs 4522 and 4523, all connected via LDTF 4524. For example, ANA 4530 comprises one NSM 4531 and two ASMs 4532 and 4533, all connected via so-called intra-ANA LDTF 4534. For example, ANA 4540 comprises one NSM 4541 and two ASMs 4542 and 4543, all connected via LDTF 4544. At the same time the LDTF connectivity is extended via so-called inter-ANA LDTF 4501. As a result, each ASM (of any ANA) can be made a backup ASM for zero or more other ASMs (again from any other ANA), for example ASM 4512 can operate as a backup ANA for ASM 4543, or as a backup ANA for ASM 4513.

Figure 7:
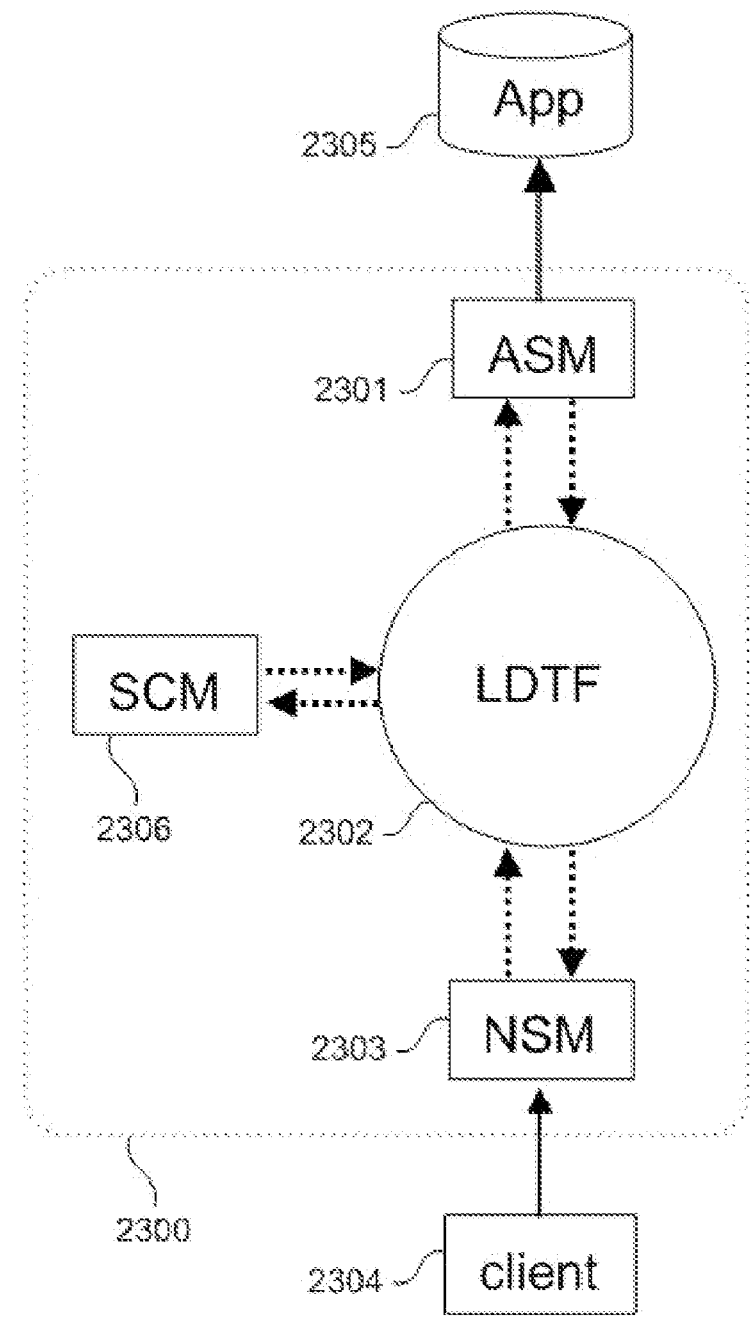
FIG. 7 is a block diagram of an ANA with a System Control Module (SCM) according to one embodiment of the invention.

FIG. 7 illustrates how SCMs can be connected to the other components. The ANA 2300, which can, for example, be the ANA 2100 of FIG. 2, behaves as a proxy for client-to-server connections and can be connected, for example, to a client 2304 and an application server 2305. The ANA 2300 can have one or more NSMs, such as NSM 2303, connected via LDTF 2302 to one or more ASMs 2301 for network processing. Also connected to the LDTF 2302 is a SCM 2306 which performs the administrative tasks. In one embodiment of the invention, IB is used as the LDTF, which can support virtual lanes and a dedicated virtual lane may be reserved just for system management communication involving the SCM.

Figure 8:
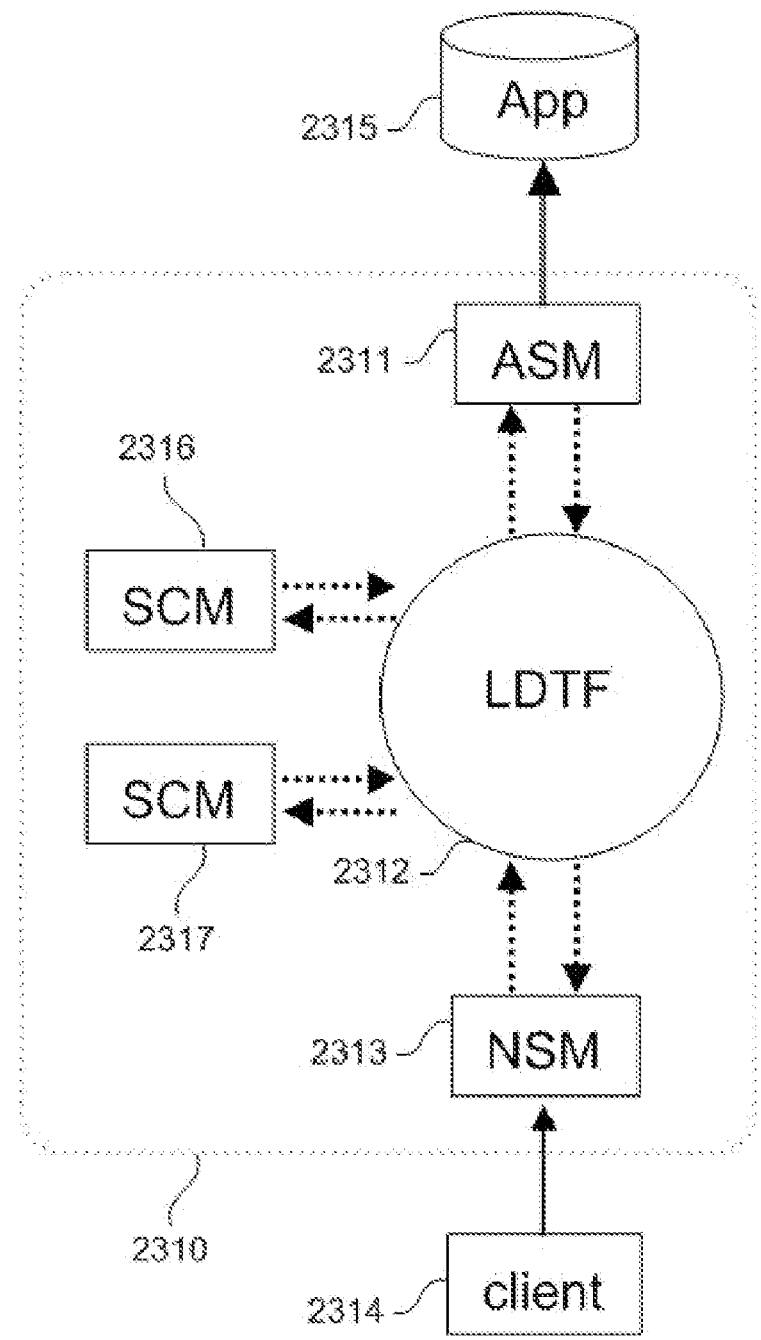
FIG. 8 is a block diagram of an ANA with two or more SCMs according to another embodiment of the invention.

For performance scaling purposes and to support high-availability, two or more SCMs can be connected to the LDTF. For example, in one embodiment of the invention, which is illustrated in FIG. 8, an ANA 2310, which behaves as a proxy for client-to-server connections and connected for network processing, for example, to a client 2314 and an application server 2315. The ANA 2310 can have one or more NSMs, such as NSM 2313, connected via LDTF 2312 to one or more ASMs, such as ASM 2311. The ANA 2310 can also have two—or more—SCMs, such as SCM 2316 and SCM 2317, also connected to LDTF 2312.

Figure 9:
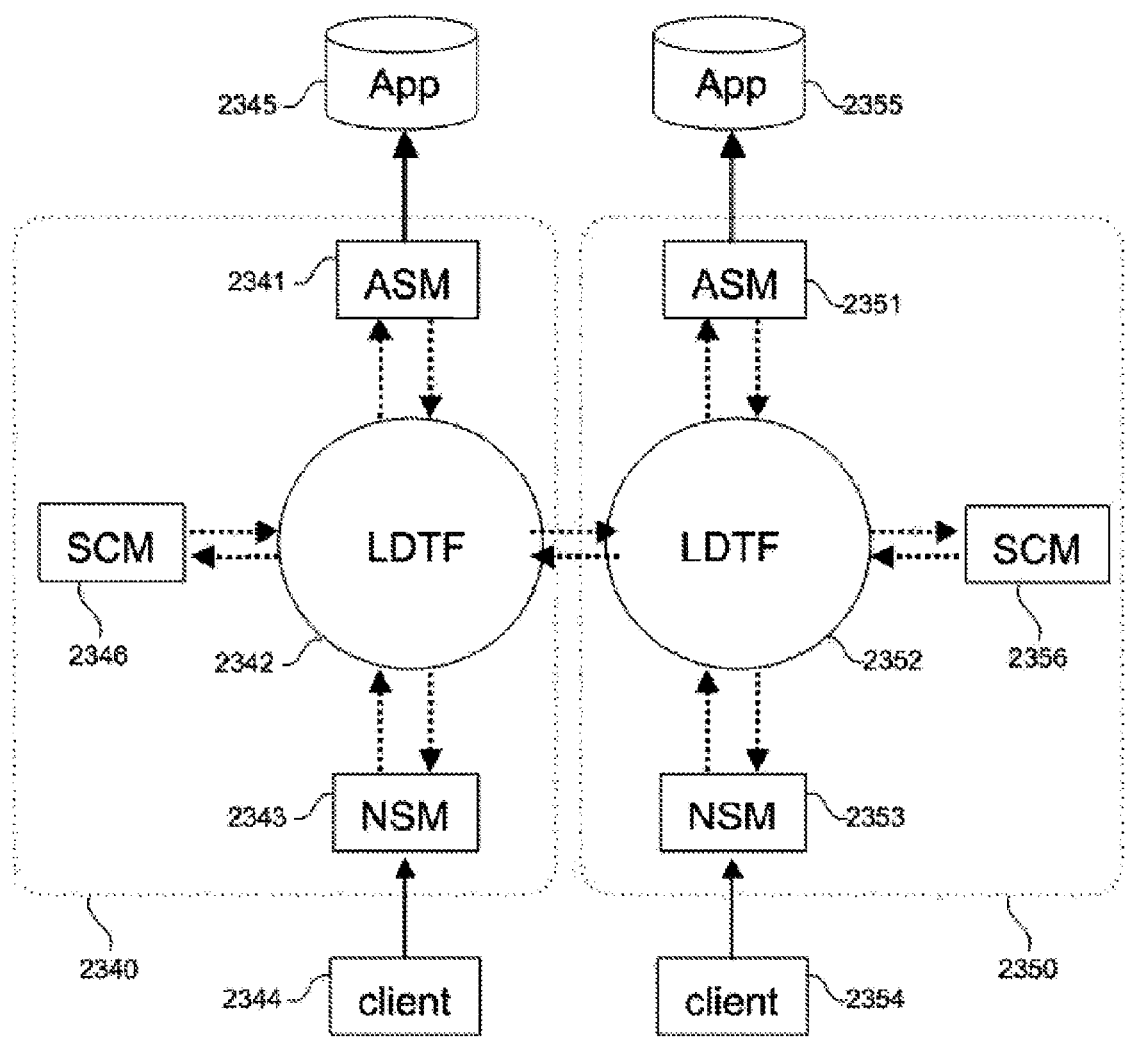
FIG. 9 is a block diagram of an ANA using two or more ANAs with a SCM according to another embodiment of the invention.

In yet another embodiment of the invention, as is illustrated in FIG. 9, two—or more—ANAs, such as ANA 2340 and ANA 2350, can be connected via a high-availability link using LDTF. The high-availability link can be an external extension of the internal LDTFs 2342 and 2352. Each ANA can then operate as a backup ANA for one of its peers as it is described above. Similarly to NSMs and ASMs, the two—or more—SCMs can replicate their state information and update their state information in their backup ANA's SCM by writing state information into the peer's memory via the LDTF using, for example, RDMA. Similarly, in yet another embodiment of the invention, two—or more—ANAs can comprise two—or more—SCMs.

L2-L5 Processing Unit—NSM

Figure 10:
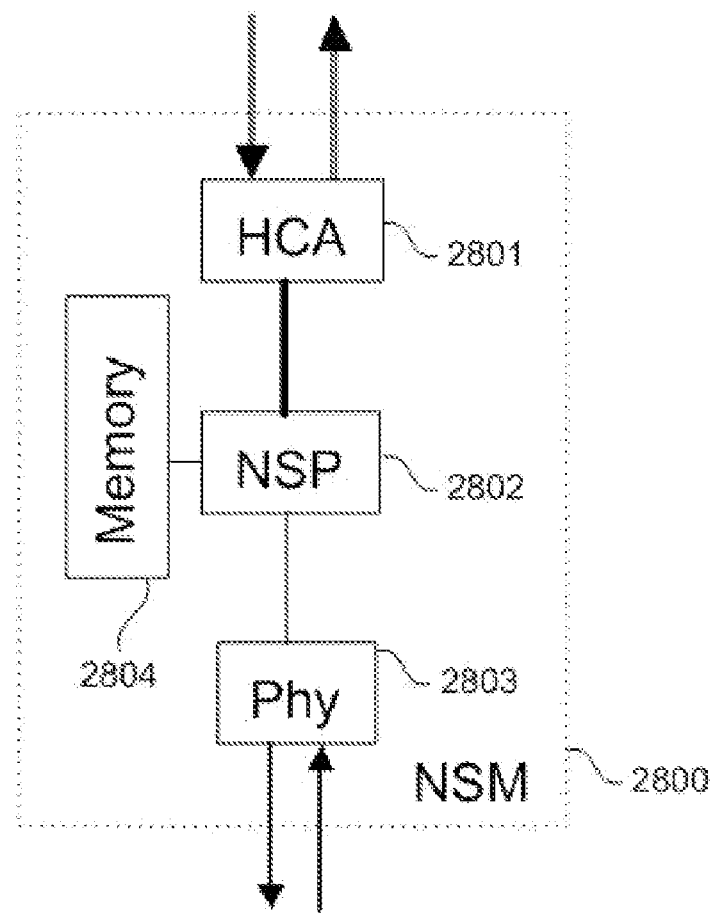
FIG. 10 is a block diagram of a Network Service Module (NSM) of an ANA according to one embodiment of the invention.

A NSM processes the lower network layers, ISO Layer-2 to ISO Layer-5. In one embodiment of the invention, such a NSM can be constructed as shown in FIG. 10. The NSM 2800 which can be, for example, the NSM 2373 in FIG. 10, comprises a host channel adapter (HCA) 2801, a network services processor (NSP) 2802, an physical network layer receiver (Phy) 2803 and memory 2804. The host channel adapter 2801 connects to the LDTF, which can be IB fabric. The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

For better scalability, in one embodiment of the invention, a NSM can be a multi-processor architecture. Here the NSM can comprise two—or more—NSPs, each having a dedicated host channel adapter, and dedicated memory. A load balancer is implemented in between the NSPs and the physical network layer receiver and balances the network load between the two—or more—NSPs. The load balancer can use common approaches known in the art to balance ingress or egress network traffic.

L7 Processing Unit—ASM

Figure 11:
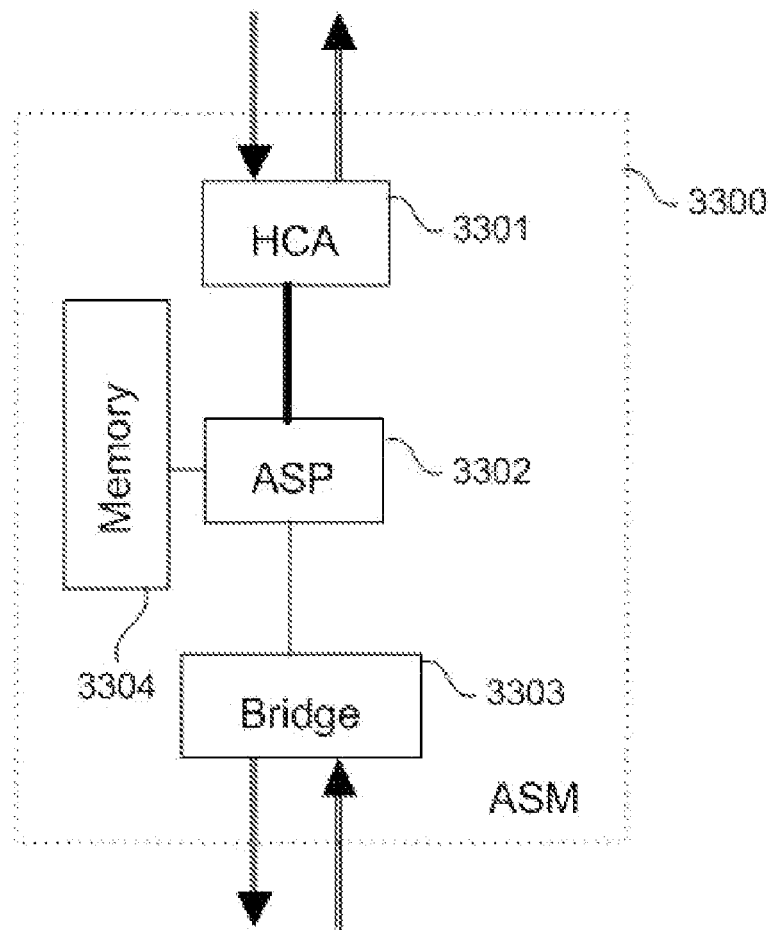
FIG. 11 is a block diagram of an Application Service Module (ASM) of an ANA according to one embodiment of the invention.

An ASM performs the ISO Layer-7 services, including application data processing on the data stream, which is the data stream of the transport protocol's PDU payload transformed by one or more NSMs. FIG. 11 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

LDTF to Connect L2-L5 Unit with L7 Units

Figure 12:
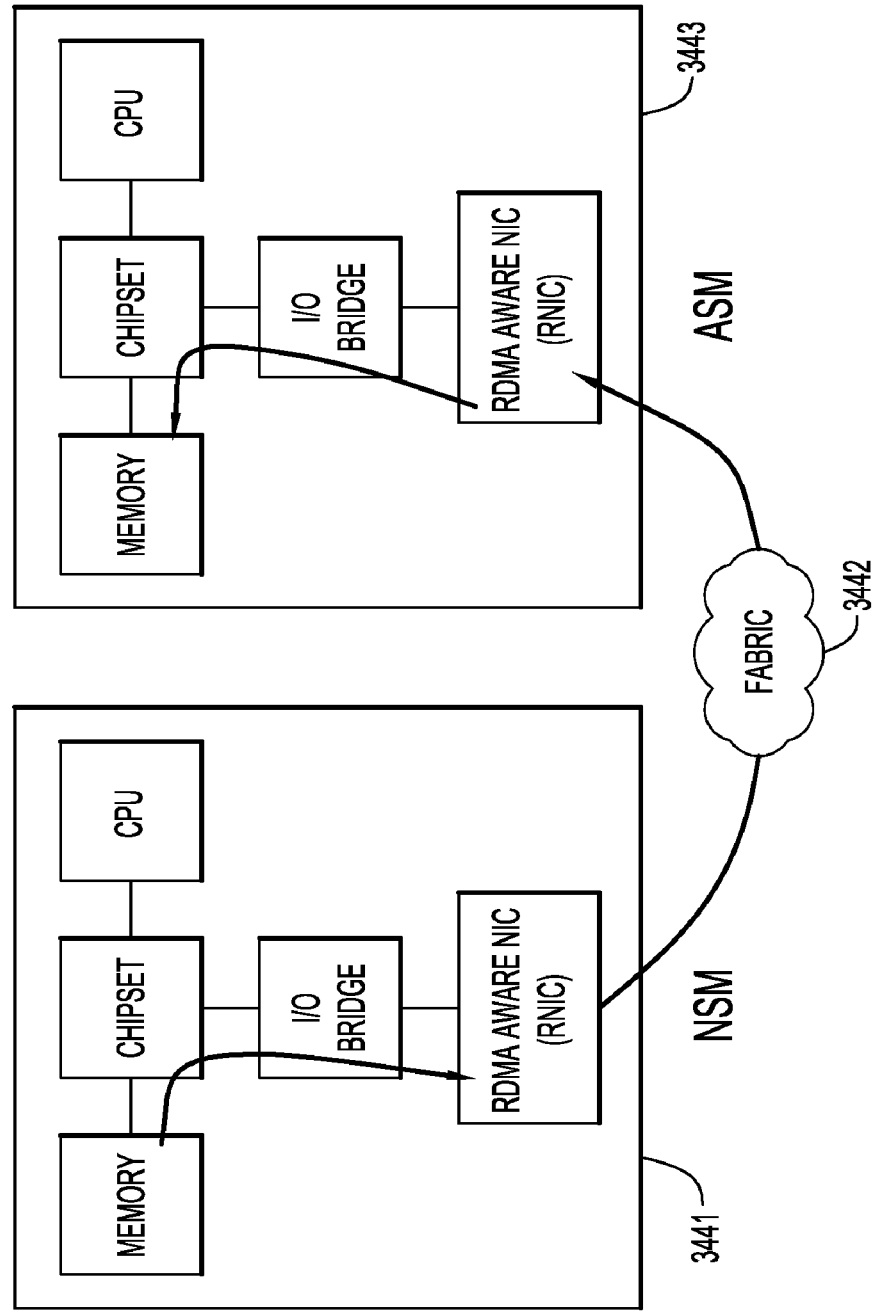
FIG. 12 is a block diagram which illustrates LDTF connectivity between a NSM and an ASM of an ANA according to one embodiment of the invention.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 12 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

Stream Switch Architecture Based on LDTF

One fundamental, novel principle of this approach is to split the processing architecture into separate planes: A Management Service plane, a Network Service plane and an Application Service plane. The Management Service plane comprises one or more SCMs and is used for all out-of-band connectivity to processing elements on the Network Service plane and to processing elements on the Application Service plane and can be used, for example, for software image downloading, command-line interface, statistic collection messages, general system management functions, configuration management, etc. The Network Service plane comprises one or more NSMs for ISO Layer-2 to ISO Layer-5 processing and proxy functions. The Application Service plane comprises one or more ASMs for ISO Layer-7 services processing and for data stream analysis. As discussed above, this division into a Network Service plane and Application Service plane should be viewed as exemplary only, and other divisions and arrangements and number of service planes may be contemplated by one of skill in the art.

This tri-planar architecture is, for example, shown in FIG. 7, where ASM 2301 performs the processing for the Application Services, NSM 2303 performs the processing for the Network Services and SCM 2305 performs the processing for the Management Service plane. The lossless, low-latency, high-bandwidth LDTF 2302 connects these processing planes for efficient, reliable and scalable inter-process communication. While FIG. 7 explains the tri-planar architecture for the case of converged data center fabric connections to application servers, this tri-planar architecture can easily be adjusted to function with standard Ethernet for application server connections. The adjustments become clear when comparing the architectural aspects for the case of using converged data center fabric for using standard Ethernet.

Figure 13:
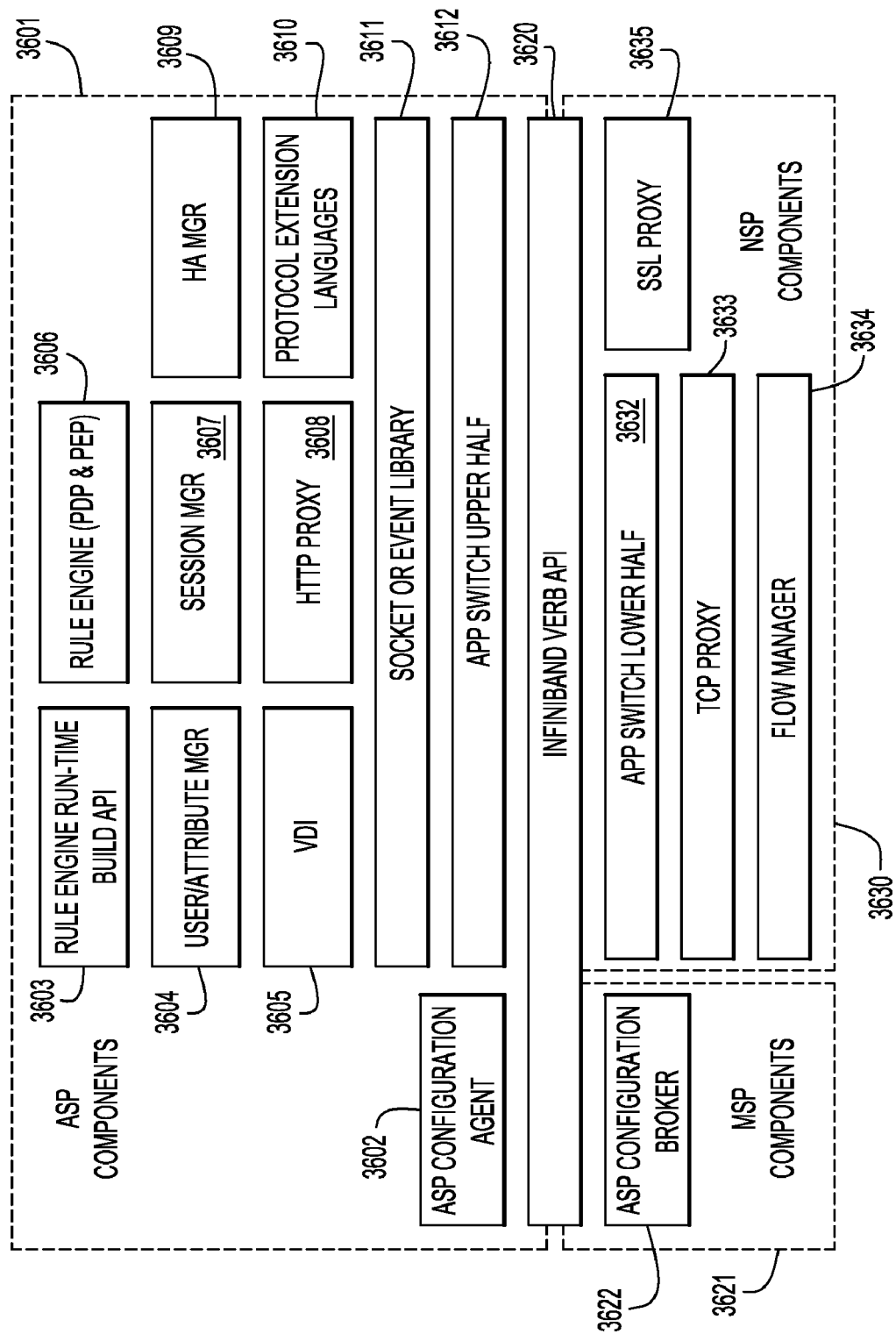
FIG. 13 is a block diagram of functional components for inter-process communication between a NSM and an ASM of an ANA according to one embodiment of the invention.

One embodiment of the invention is shown in FIG. 13, which shows exemplary, non-limiting functional components of an ANA. The processing in Application Service plane is done by ASP components 3601, the processing in the Network Service plane is done by NSP components 3630, the processing in the Management Service plane is done by Management Service processor components 3621 and the LDTF inter-process communication is done by the IB Verb API 3620 which utilizes standard IB techniques known in the art. The ASP components 3601 comprise an ASP configuration agent 3602, the rule engine run-time build API 3603, the user/attribute manager 3604, the Virtual Directory Infrastructure 3605, the rule engine PDP and PEP 3606, the session manager 3607, the HTTP proxy 3608, the high-availability manager 3609, the protocol extension languages 3610, the socket or event library 3611, the application switch upper half 3612. The ASP configuration agent 3602 interacts with the ASP configuration broker 3622 from the Management Service plane 3621 to perform administrative tasks, such as configuration of components with appropriate parameters. The rule engine run-time build API 3603 provides a procedural interface for building rules based on the policies loaded. The user and attribute manager 3604 extracts the various attributes from the data stream which are needed to evaluate policy rules. The user and attribute manager 3604 can, for example, comprise the user/attribute manager and the content attribute manager. The Virtual Directory Infrastructure 3605 provides routines for interacting with Virtual Directory Infrastructure. The rule engine PDP and PEP 3606 provide routines for evaluating rules from policies. The session manager 3607 provides routines for extracting, managing and storing session information and can, for example, interface with the session record table. The HTTP proxy 3608 provides routines to perform operations required when proxying the HTTP protocol in this centrally terminated stream-switch architecture. The high-availability manager 3609 performs routines for monitoring components and for synchronizing redundant stateful data in the various components. The protocol extension languages 3610 provides routines required for proxying custom protocols from Application Services. The socket or event library 3611 provides, for example, routines for non-RDMA communication which uses TCP sockets. The application switch upper half 3612 interacts with the IB Verb API 3620 and provides routines for RDMA-based inter-process communication.

Modules Overview—ASM

Figure 14:
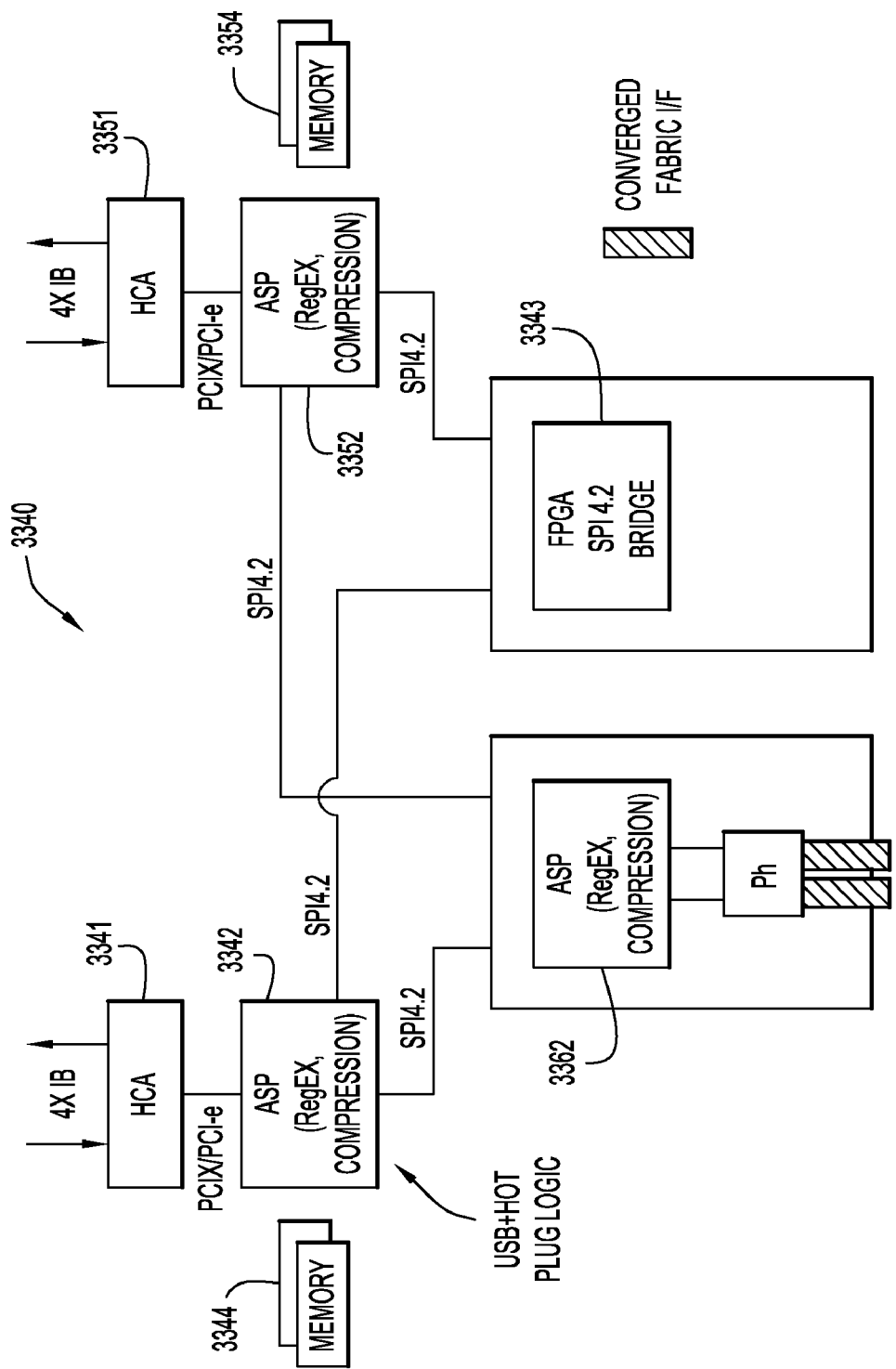
FIG. 14 is a block diagram of an ASM of an ANA according to yet another embodiment of the invention.

On the hardware side, an ASM comprises one or more ASPs. In one embodiment of the invention the ASM is the ASM 3300 of FIG. 11. In another embodiment of the invention the ASM is the ASM 3340 of FIG. 14. The ASM 3340 can comprise one or more ASPs 3342, 3352 and 3362, FPGA SPI bridge 3343, Memory 3344 and 3354, and IB host channel adapters HCA 3341 and 3351 which provide connection to the IB fabric. The ASPs 3342, 3352, 3362 and the FPGA 3343 are also connected via SPI 4.2 buses. The ASP 3362 also is connected to a Phy, which connects to converged data center fabric.

Many different possibilities exist for implementing an ASP. Because an ASP has to perform compute intensive tasks which can be parallelized efficiently, it is desirable to use a multi-processing for the ASP. In one embodiment of the invention, the ASP comprises multiple CPU cores for parallel processing. Because very specialized processing—namely data stream processing—needs to be done within an ASP it is also desirable to deploy special purpose hardware accelerator units within an ASP.

On the software side, the one or more ASPs of an ASM run, for example, routines for HTTP protocol proxy functions, CIFS protocol proxy functions, JDBC protocol proxy functions, regular expression checks, protocol recognition, application authorization, and state replication to backup ASPs. The software architecture of an ASP is similar to an NSP of an NSM described above.

Modules Overview—LDTF Connectivity

Figure 15:
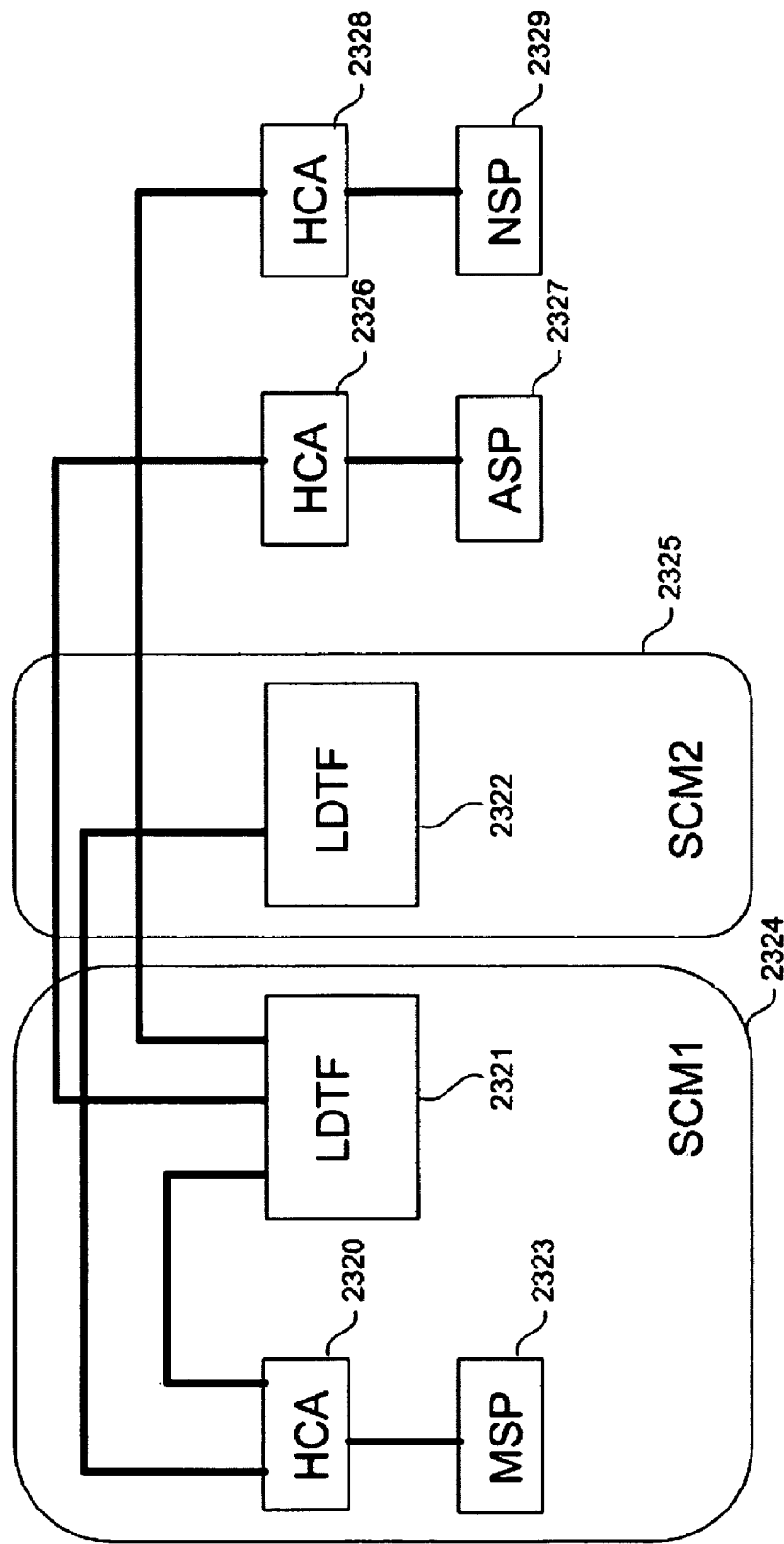
FIG. 15 is a block diagram which illustrates the connectivity of the LDTF according to another embodiment of the invention.

The LDTF provides the data plane connectivity between the one or more NSMs and the one or more ASMs. The LDTF can also provide management plane connectivity between the one or more SCMs, the one or more NSMs and the one or more ASMs. This is shown in FIG. 15 where, for example, two SCMs SCM1 2324 and SCM2 2325 provide LDTF switch 2321 and 2322. Connected to LDTF switch 2321 is Management Service processor MSP 2323—via host channel adapter HCA 2320—NSP 2327—via host channel adapter HCA 2326—and NSP 2329—via host channel adapter HCA 2328. Connected to LDTF switch 2322 is Management Service processor MSP 2323—via host channel adapter HCA 2320. In one embodiment of the invention, IB fabric is used to provide lossless, low-latency, high-bandwidth any-to-any switching. The IB fabric supports multicast communication and credit-based flow control. IB can support 16 virtual lanes; 15 virtual lanes can be used to implement the data plane and one virtual lane can be used to implement the management plane.

Processing Flows

Splitting the data network processing into two separate domains, Network Service processing and Application Service processing—especially when constrained by scalability and high-availability—may require a particular processing flow between the one or more NSPs and the one or more ASPs.

For example, it is desirable to enforce flow-control because the proxy splits the client-server connection into two portions: One client-to-proxy connection which typically has a high round-trip delay time and low throughput and a proxy-to-server connection which typically has low round-trip delay time and high throughput. The flow control for the client connection and the server connection mimic the behavior of the end-to-end flow-control of the original client-to-server connection. The internal LDTF enables the mapping of connection-level flow-control using RDMA queue-pair flow-control and therefore solves the problem created by splitting the client-server connection with a proxy.

Figure 16:
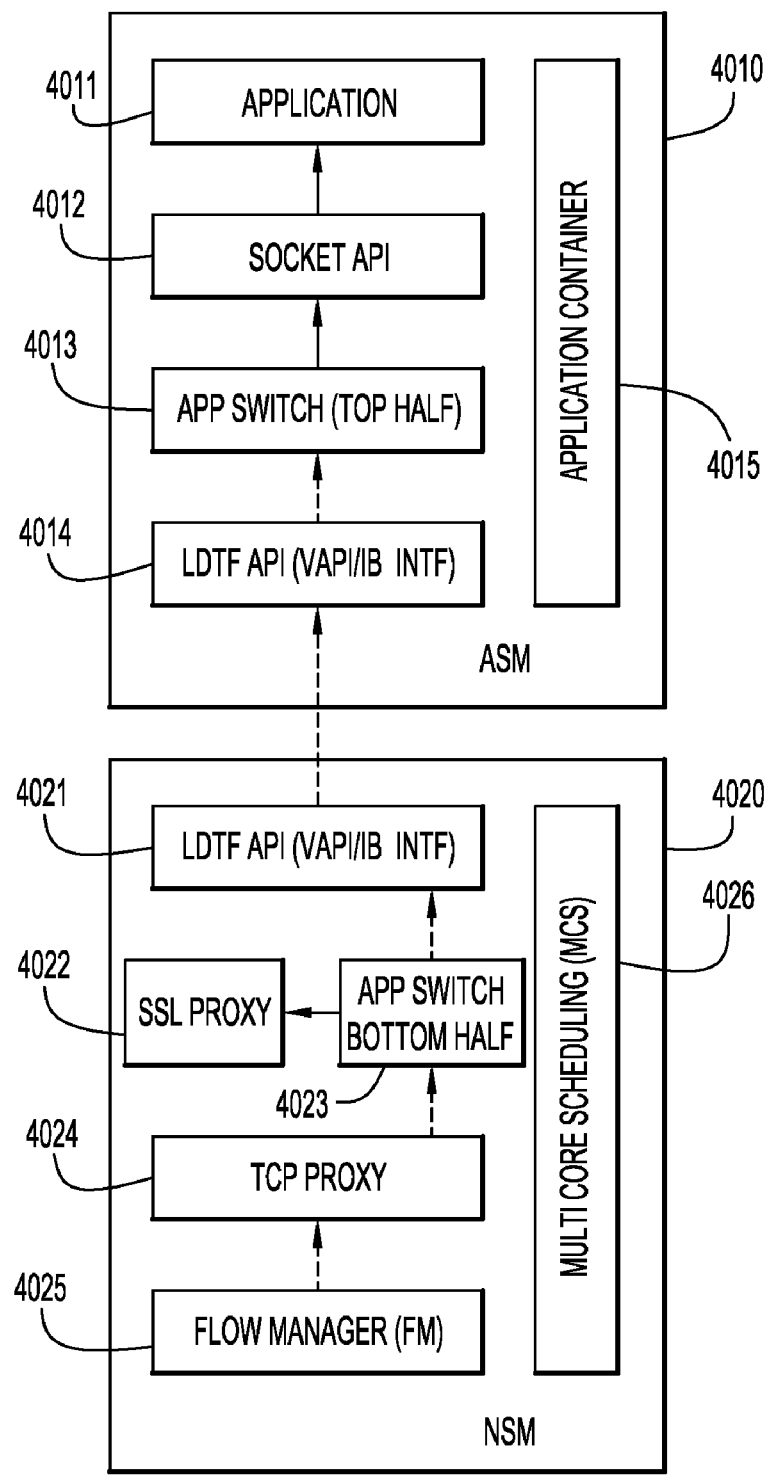
FIG. 16 is a block diagram which illustrates inter-process communication between a NSP and an ASP in an ANA according to one embodiment of the invention.

FIG. 16 shows a processing flow in accordance to one embodiment of the invention. The network processing is split between the Network Service processing 4020 and the Application Service processing 4010. The Network Service processing 4020 can, for example, be done by NSM 3300 of FIG. 11. The Network Service processing 4020 comprises Flow Manager 4025, TCP Proxy 4024, SSL Proxy 4022, Application Switch 4023, Channel API 4012, and Multi-Core Scheduling 4026. The Flow Manager 4025 performs network load balancing on ingress and egress network connections. The TCP Proxy 4024 does TCP termination and acts as an ISO Layer-2 to ISO Layer-4 proxy between client and server. The Application Switch 4023 transforms (among other processing) the PDU payload into a data stream. In case the network data is SSL encrypted, the data stream is forwarded to SSL Proxy 4022. Then the data stream is sent to the Channel API 4021 which sends the data stream data via the LDTF to the ASM's Channel API 4014. The Multi-Core Scheduling 4026 performs load balancing of the network processing among two or more NSPs. The Application Service processing 4010 comprises the Channel API 4014, the Application Switch 4013, the Socket API 4012, the Application processing 4011, and the Application Container 4015. The Channel API 4014 receives the data stream data from the NSM's Channel API 4021 and forwards it to the Application Switch 4013, which performs ISO Layer-7 processing on the data stream data such as Triangulated Authorization, etc. To submit the data stream data to the Application 4011, the Socket API 4012 is used. The Application 4011 can, for example, be applications 2005 from FIG. 2. The Application Container 4015 performs load balancing on the two or more ASPs such that the data stream information is either processed in a parallel fashion, in a pipelined fashion, or in a hybrid fashion.

Scalability

Various embodiments of some of the inventions for scalability have been described in this disclosure, for example, the embodiment of the invention illustrated in FIG. 6 can not only be used for high-availability but also to scale an ANA for higher bandwidth and network processing demands. When two or more NSMs or two or more ASMs are connected via LDTF within one ANA, the inter-process communication between NSMs and ASMs then operates via so-called intra-chassis communication. Alternatively, when two or more ANAs are connected via LDTF, the inter-process communication then operates via so-called inter-chassis communication. Or, when both approaches are combined, both intra-chassis and inter-chassis communication goes over the LDTF.

Alternative Embodiments

In one embodiment of the invention, the implementation uses Ethernet 10, which supports one or more 10/100/1000 TX or FX interfaces, or one or more 10 Gigabit XFP/SFP+/XENPAK interfaces. In one embodiment of the invention, the network interfaces are integrated into the one or more NSPs. In another embodiment of the invention, the network interfaces are dedicated devices externally connected to the one or more NSPs. In one embodiment of the invention, a NSP can be implemented using a MIPS-based CPU architecture such as provided by RAZA Microelectronics, Inc., by Cavium Networks, by Broadcom Corporation, or others. In yet another embodiment of the invention, a NSP can be implemented using the PowerPC architecture. In yet another embodiment of the invention, the NSP can be implemented using X86 architecture. In yet another embodiment of the invention, the NSP can be implemented using FPGAs from suppliers such as Altera Corporation or from Xilinx, Inc. In yet another embodiment of the invention, the NSP can be implemented using SoC devices, for example from EZChip Technologies. In yet another embodiment of the invention, the NSP can be implemented with a microprocessor which has dedicated hardware acceleration for network processing such as for TCP/SSL flow termination, initiation of TCP, encryption and decryption, etc. In one embodiment of the invention, an ASP can be implemented using a MIPS-based CPU architecture such as provided by RAZA Microelectronics, Inc., by Cavium Networks, by Broadcom Corporation, or others. In another embodiment of the invention, an ASP can be implemented using the PowerPC architecture. In yet another embodiment of the invention, the ASP can be implemented using X86 architecture. In yet another embodiment of the invention, the NSP can be implemented using FPGAs from suppliers such as Altera Corporation or from Xilinx, Inc. In yet another embodiment of the invention, the ASP can be implemented using SoC devices, for example from EZChip Technologies. In yet another embodiment of the invention, the ASP can be implemented with a microprocessor which has dedicated hardware acceleration for network processing such as for TCP/SSL flow termination, initiation of TCP, encryption and decryption, etc.

In one embodiment of the invention, a host channel adapter is used to connect the one or more ASPs and the one or more NSPs to the LDTF and the host channel adapter interfaces with PCI-X, PCIe, or HyperTransport protocol. In another embodiment of the invention, that host channel adapter is a multi port or at least a dual ported device which supports active-active configuration or which supports active-standby configuration. In one embodiment of the invention, the LDTF devices support a hardware retry mechanism. In another embodiment of the invention, the LDTF devices interface with IB. In yet another embodiment of the invention, the LDTF devices interface with Data Center Ethernet. In one embodiment of the invention, the external LDTF for inter-chassis communication is using copper fabric. In another embodiment of the invention, the external LDTF for inter-chassis communication is using a fiber optics fabric.

Use of LDTF to Provide High-Availability

LDTF as a lossless, low-latency, high-bandwidth inter-process communication infrastructure can be utilized to achieve scalability and high-availability. Scalability is achieved by having two or more processing components such as NSPs or ASPs for a more parallel or a more pipelined computation. High availability is achieved by adding redundancy to the system and by having peer ANAs or peer modules replicate the relevant state information in persistent databases. One embodiment of the invention is shown in FIG. 6, where redundancy can be added at the ANA level—ANAs 4510, 4520, 4530 and 4540 can all serve as each other's redundant backup ANA—and where redundancy can also be added at the module level—within an ANA, for example ANA 4510, two or more ASMs, for example, the two ASM 4512 and ASM 4513, can serve as each other's backup ASM. In another embodiment of the invention, two or more ANAs or two or more modules can be used for scalability—to provide high processing performance in conjunction with the other ANAs or modules, but when certain ANAs or modules fail, other peer ANAs or peer modules can act as backup. If the processing performance of this degraded system is not sufficient, certain lower priority services may get dropped in favor of critical services, which have a higher priority.

Figure 17:
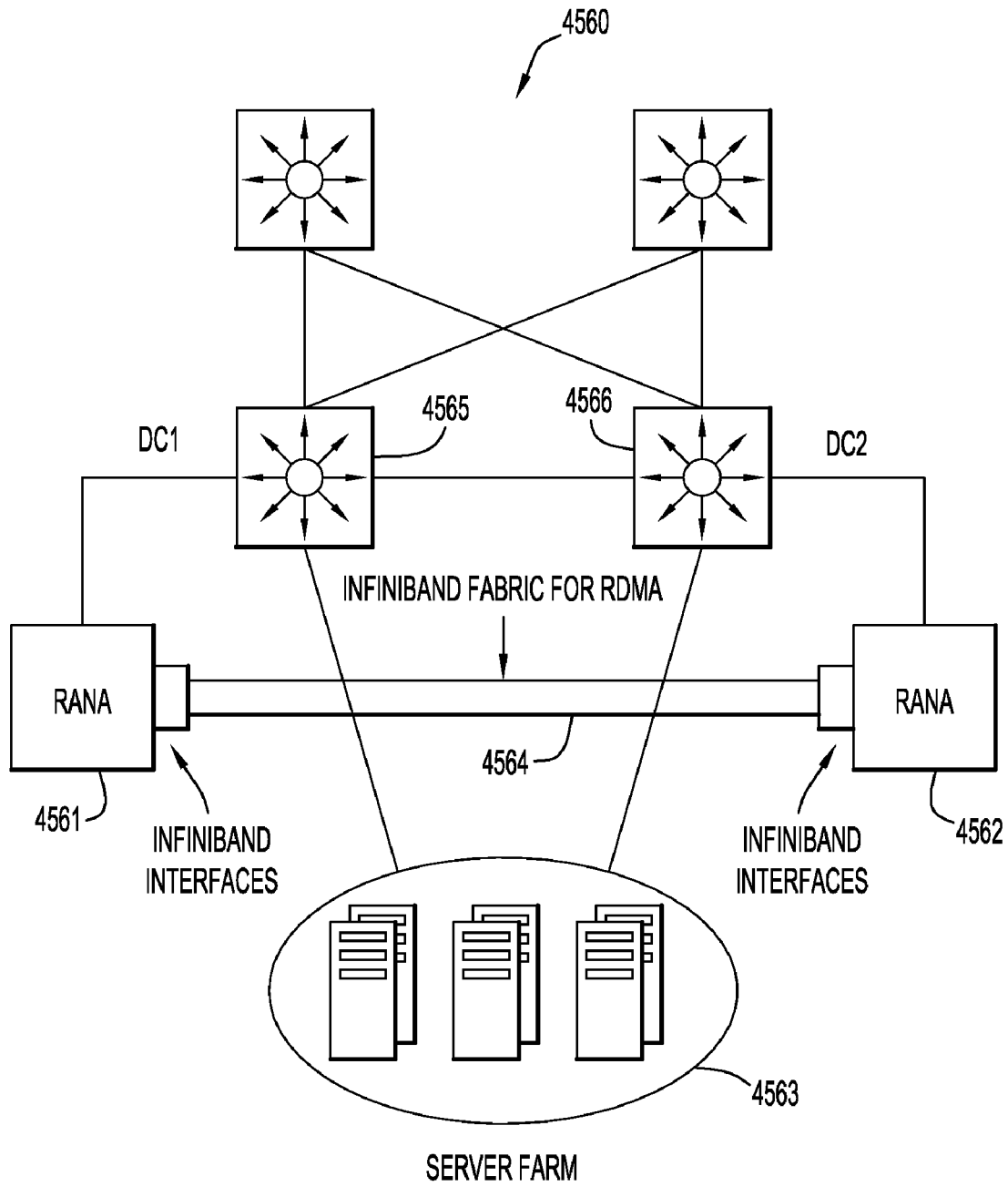
FIG. 17 is a block diagram which illustrates deployment of an ANA in a high-availability mode according to one embodiment of the invention.
Figure 18:
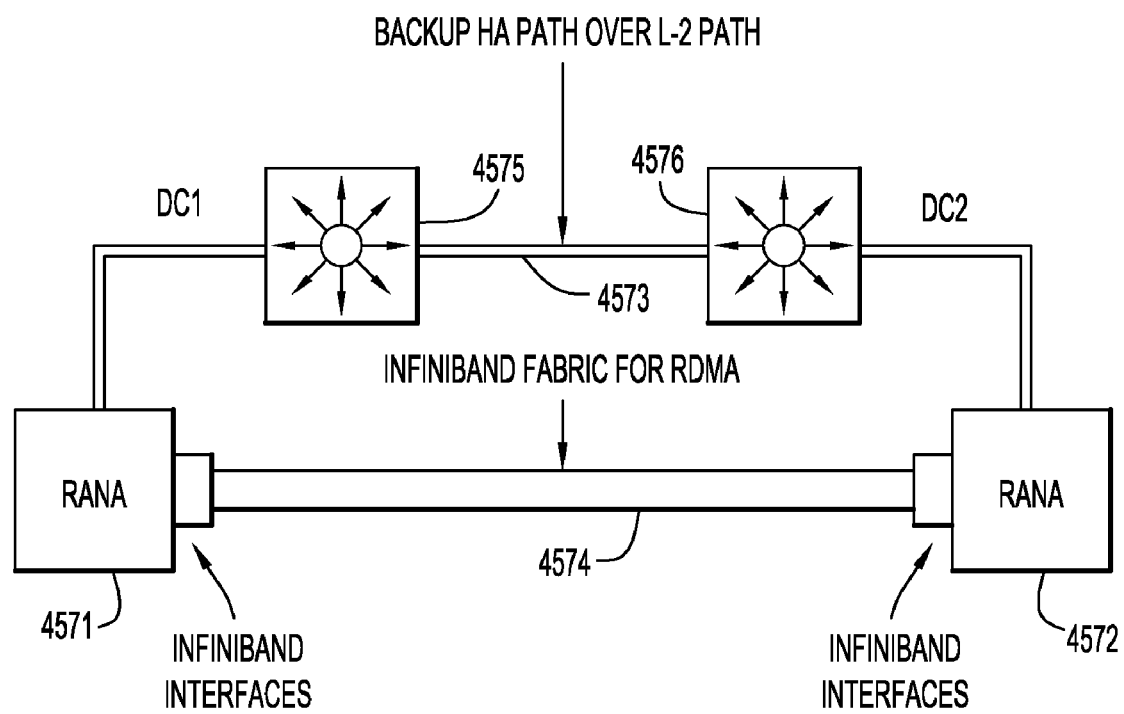
FIG. 18 is a block diagram which illustrates deployment of an ANA in a high-availability mode with a backup network path according to another embodiment of the invention.

Various embodiments for providing high-availability exist. For example, FIG. 17 shows how two (or more) ANAs 4561 and 4562 provide access control to application servers 4565 and 4566, which interact with the server farm 4563 in a data center 4560. Using IB, for example, a RDMA-enabled backup link 4564 connects the two ANAs 4561 and 4562 such that both ANAs can replicate each other's state information and act as each other's backup. In FIG. 18, it is shown how, in another embodiment of the invention, the reliability can be increased further by utilizing existing connectivity between application servers as an additional backup link. Two (or more) ANAs 4571 and 4572, which can, for example, be ANAs 4561 and 4562 from FIG. 17 provide access control to application servers 4575 and 4576. Using IB, for example, a RDMA-enabled backup link 4574 connects the two ANAs 4571 and 4572 such that both ANAs can replicate each other's state information and act as each other's backup. A redundant backup path, which complements backup link 4574 can be created, by utilizing the ISO Layer-2 path 4572 via application servers 4575 and 4576.

Figure 19:
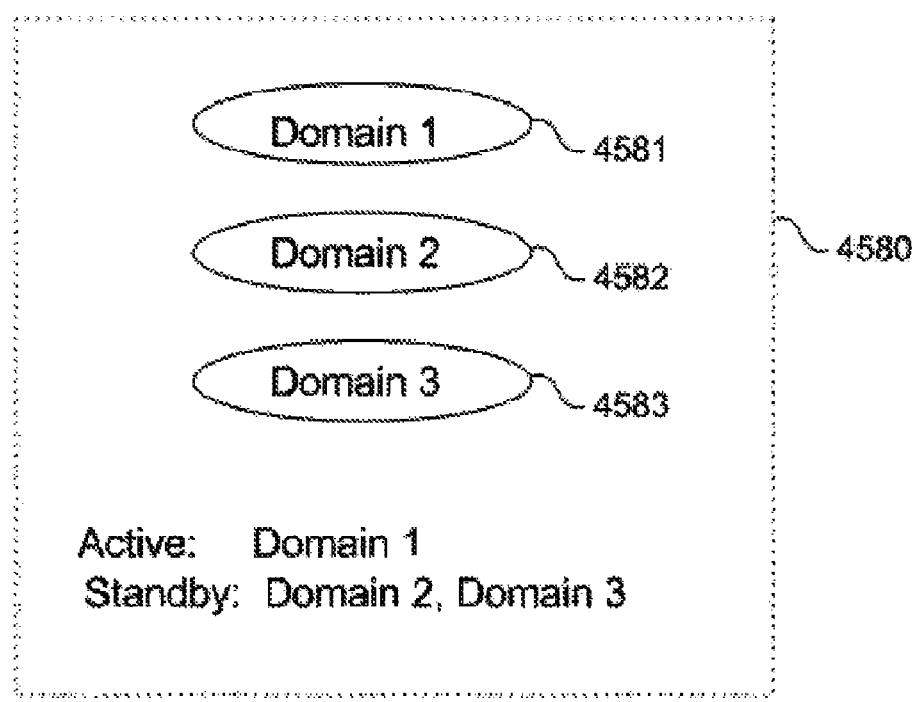
FIG. 19 is a block diagram which illustrates deployment of an ANA in an active-active setup for a high-availability mode according to another embodiment of the invention.
Figure 19:
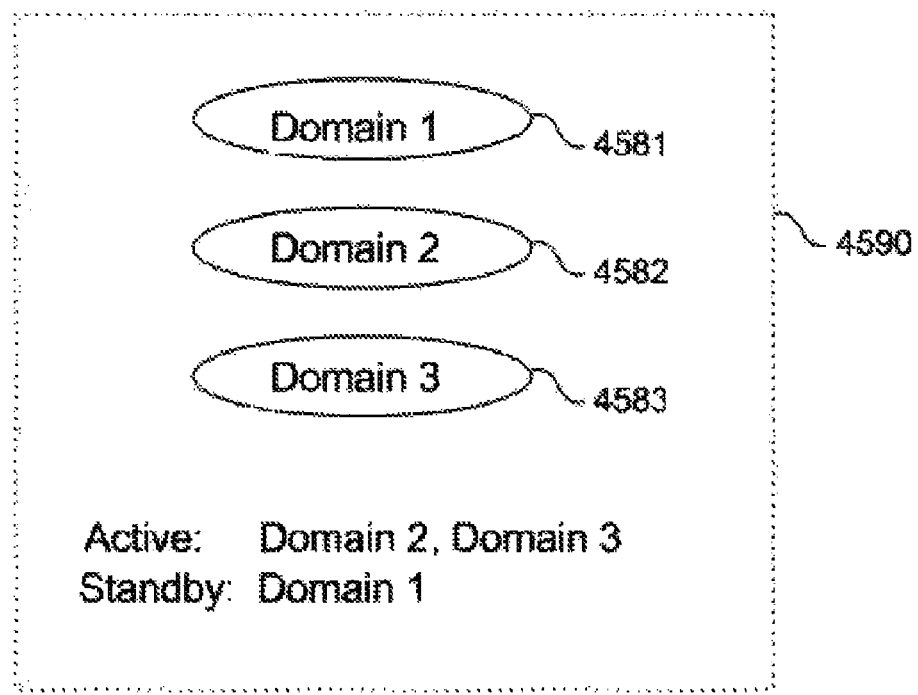

To explain the fundamental principle of the novel approach to redundancy shown here, FIG. 19 shows, in an example, how two peer ANAs 4580 and 4590 can act as each other's backup. Appliance 4580 actively serves Domain 1 4581 and maintains state information for Domain 2 4582 and Domain 3 4583 for standby purposes. Appliance 4590 actively serves Domain 2 4582 and Domain 3 4583 and maintains state information for Domain 1 4581 for standby purposes. Upon a failure in either ANA the peer ANA takes over and now actively serves the one or more domains for which it had kept state information for standby purposes. For example, upon a failure in ANA 4580 the peer ANA 4590 now actively serves all three domains, Domain 1 4581, Domain 2 4582 and Domain 3 4583. Because ANA 4590 has kept state information in a persistent replicated database for all domains it can provide zero-click fail-over.

Such state information can, for example, include chassis configuration information, information about the transport protocol streams that have reached an ANA, as well as ISO Layer-7 state information.

System configuration information can be synchronized for many of the configured components. There are two aspects to system configuration. The first is during system startup. This is when either both peers are powered ON at the same time and both discover each other. One of the first things that happen at discovery is configuration information synchronization. It is desirable to have the configuration information in synchronization to ensure proper transport protocol stream and ISO Layer-7 state replication. The second aspect is during runtime. Administrators may choose to add, modify and delete portions of the configuration information. These changes can be replicated instantaneously.

The transport protocol traffic reaching one or more ANAs (or modules) can be distributed in a balanced manner. Some client-to-server sessions that are initiated may arrive at one of the one or more ANAs (or modules) while transport protocol traffic for other client-to-server sessions may reach peer ANAs (or modules) because of the way in which domains can be distributed across these peer ANAs (or modules). In any event of failure, when one ANA (or module) takes over the transport protocol traffic that previously was processed by its peer, all the ISO Layer-4 state information must be present to ensure zero-click fail-over. There are multiple ways to do this transport protocol traffic replication. In one embodiment of the invention, just the ISO Layer-4 state information from one ANA (or module) is replicated to the peer ANA (or module). This can happen always during session creation and deletion, and periodically during the lifetime of the session. This way, sessions remain in synchronization across ANAs (or modules). Also, this exchange of ISO Layer-4 state information can happen in a bi-directional manner. In another embodiment of the invention, the transport protocol stream reaching one ANA (or module) is replicated to the peer ANAs (or modules). This ensures that the backup ANA (or module) sees the same transport protocol traffic for those domains that are in a passive standby mode, so that it can go through the same steps of terminating the connection, initiating another connection and behaving as a proxy. However, domains that are passive (i.e., in standby), the backup ANA (or module) will not actually forward any traffic to either client or server but will continue to build state information as though it is actually proxying the connection. The advantage with this approach is that under any failure event on its peer, it can actively forward the session traffic transparently.

All the ISO Layer-7 state information is retained in a shared memory database that can be marked with a synchronization stamp. Therefore, any state changes in the database for ISO Layer-7 state information can be used to trigger an event to replicate the state over a high-availability link to the peer's ISO Layer-7 state information for that domain. For this purpose, several in-memory databases and embedded databases can be considered such as Berkeley-DB, for example. Database synchronizations can operate via LDTF such as, for example, IB. RDMA allows memory visibility into the peer's databases. That way the events triggered can cause a very quick, reliable update of the peer's database for the ISO Layer-7 state information.

Figure 20:
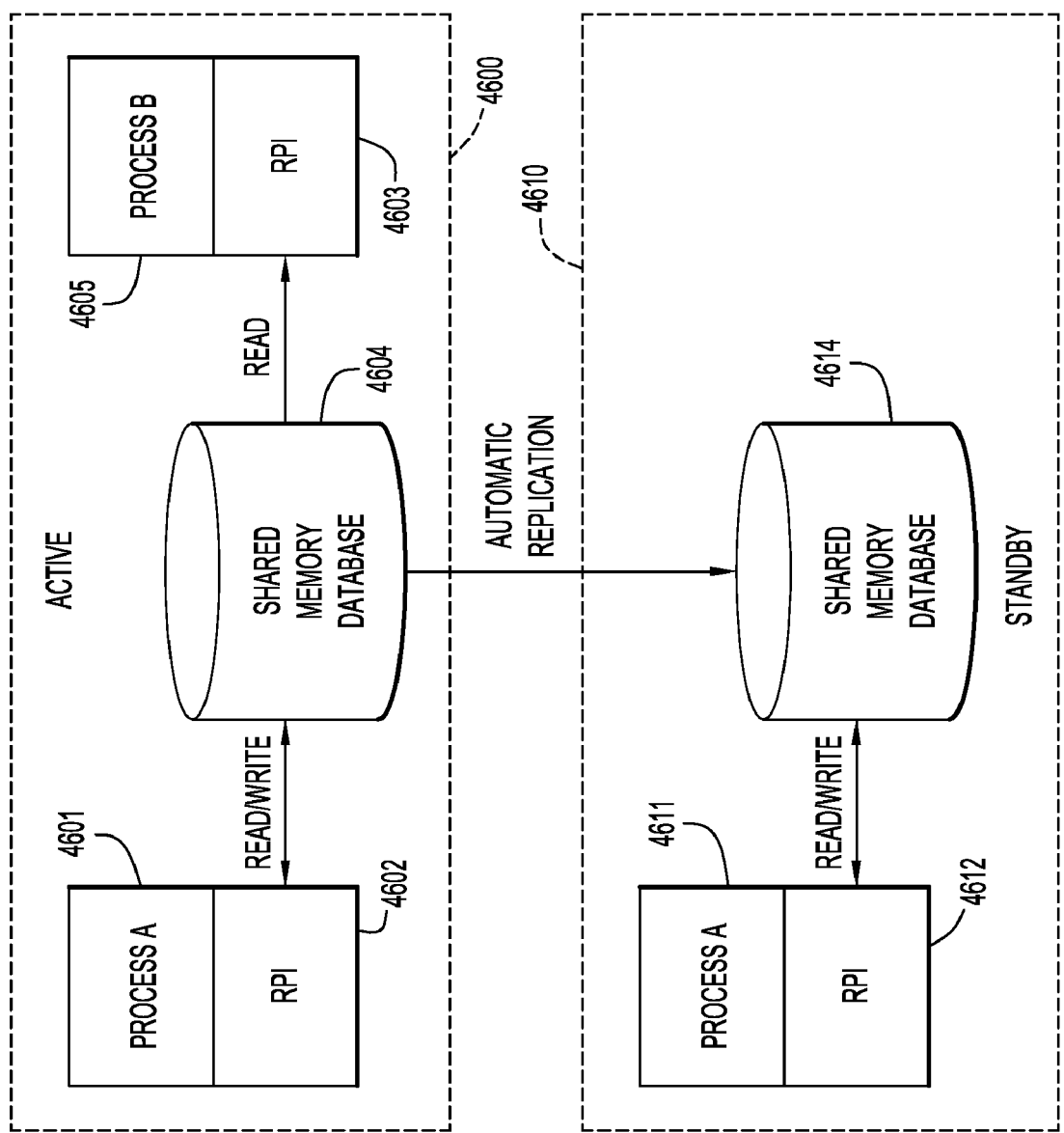
FIG. 20 is a block diagram of a replication component of an ANA in a high-availability mode according to one embodiment of the invention.

FIG. 20 shows the details for keeping persistent state information. Within one single ANA 4600 (or one single module 4600) a process, Process A 4601, actively processes the state information for one particular domain. Through Remote Procedure Interface (RPI) 4602, Process A 4601 can read from and write to the persistent Shared Memory Database 4604 the state information which relates to the actively served domain. Through Remote Procedure Interface RPI 4603, another process, Process B 4605, can read-only from the Shared Memory Database 4604 and thus may get immediate access to the state information of the domain which is actively served by Process A 4601. Therefore, Process B 4605 can act as a backup for Process A 4601 and perform a zero-click fail-over. Now, via automatic replication, Shared Memory Database 4604 and Shared Memory Database 4614 can be synchronized such that the state information, for example, for the domain actively served by Process A 4601, can be made readily available in Shared Memory Database 4614 as well. The Shared Memory Database 4614 can be located, for example, in a peer ANA 4610 (or in a peer module 4610) which is connected via LDTF 4609 to ANA 4600 (or module 4600). Through Remote Procedure Interface RPI 4612, another process, Process C 4611, can read-only from the Shared Memory Database 4614 and thus may also get immediate access to the state information of the domain which is actively served by Process A 4601. Therefore, Process C 4611 can also act as a backup for Process A 4601 and perform a zero-click fail-over.

Figure 21:
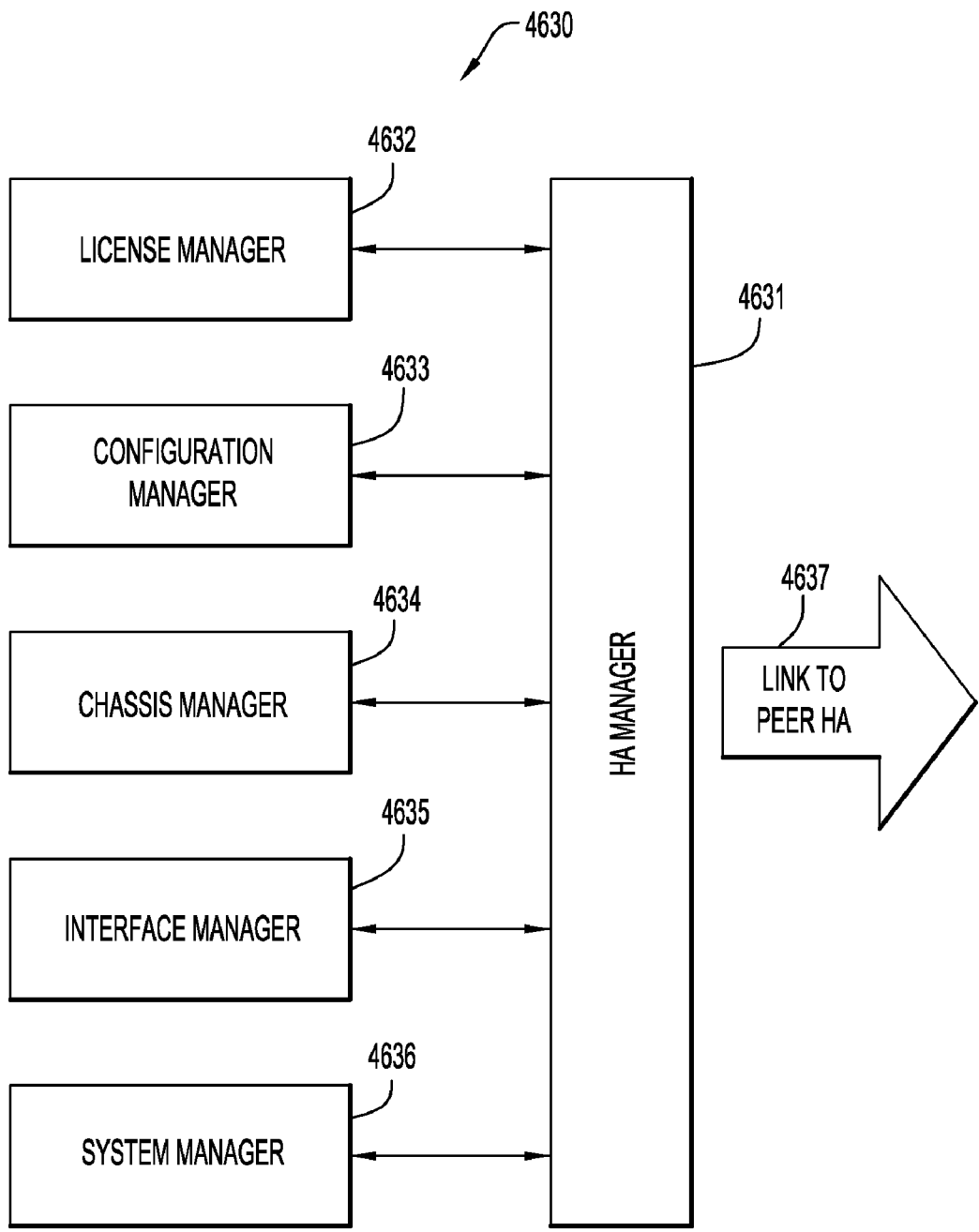
FIG. 21 is a block diagram which illustrates health monitoring in a high-availability ANA according to one embodiment of the invention.

Key to provide high-availability lies in monitoring the necessary components and ANAs to detect failures. This is illustrated in FIG. 21. Within an ANA 4630 a High-Availability Manager 4631 periodically checks the vital signs of a License Manager 4632, a Configuration Manager 4633, a Chassis Manager 4634, an Interface Manager 4635 and a System Manager 4636, for example. Each License Manager 4632, Configuration Manager 4633, Chassis Manager 4634, Interface Manager 4635 and System Manager 4636 periodically check the vital signs of their corresponding modules. Such vital signs can, for example, include voltages, temperatures, humidity, air pressure, shock, noise, vibration, fan speed, CRC error count, self-check results, etc.

Figure 22:
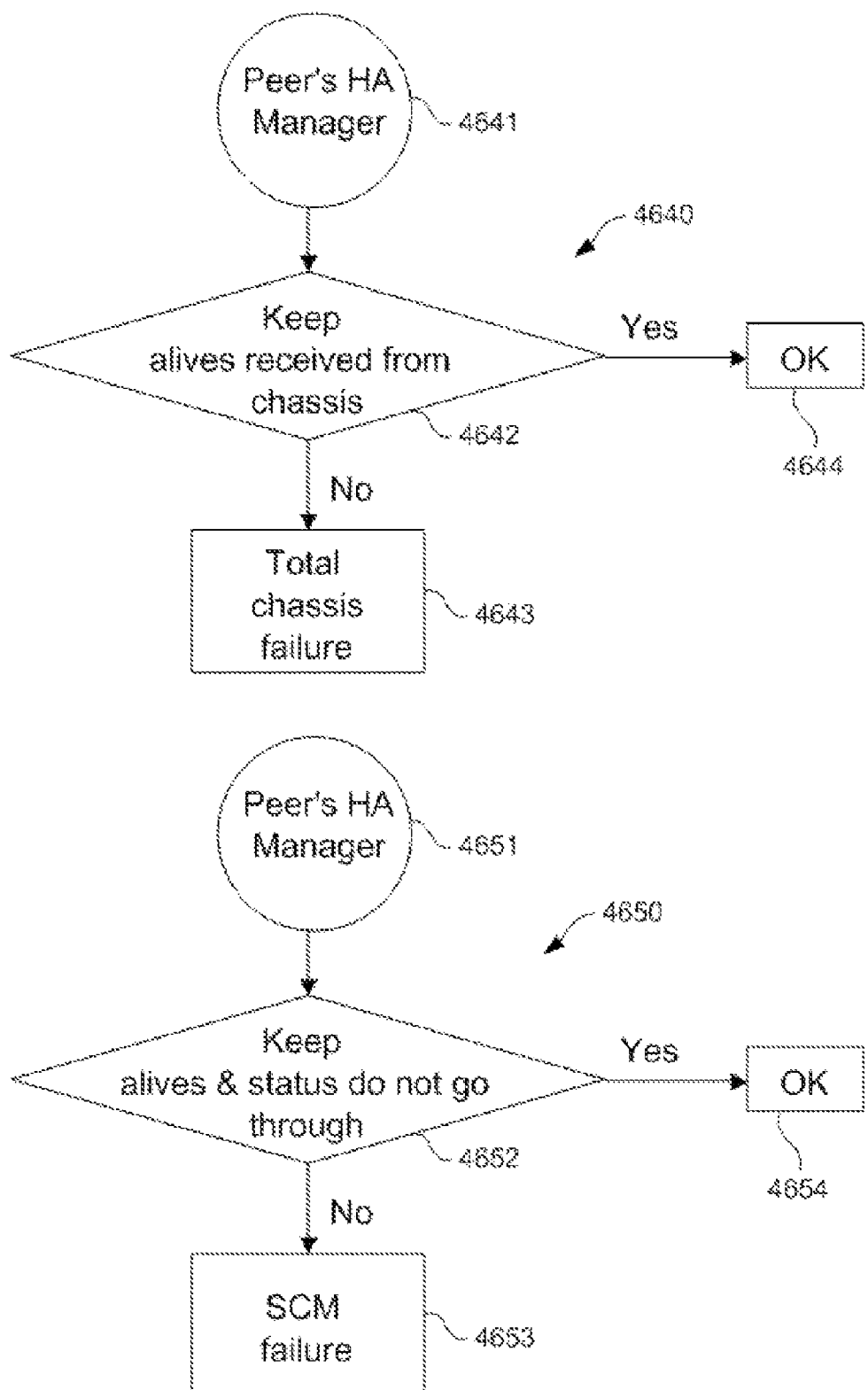
FIG. 22 shows two exemplary flow diagrams for health monitoring in a high-availability ANA according to one embodiment of the invention.

FIG. 22 shows two exemplary methods for a high-availability manager according to one embodiment of the invention. In method 4640 a peer's high-availability manager, which can, for example, be High-Availability Manager 4631 from FIG. 31, periodically sends keep-alive messages in step 4641. The high-availability manager of an ANA performs a check 4642 whether these periodic keep-alive messages are received. If these keep-alive messages have been received (YES), the high-availability manager considers the peer ANA as OK 4644. If these keep-alive messages have not been received (NO), the high-availability manager considers the peer ANA as having a total chassis failure 4643. In method 4650 a high-availability manager, which can, for example, be High-Availability Manager 4631 from FIG. 31, periodically sends keep-alive messages in step 4651 and then performs a check 4652 whether these periodic keep-alive messages did get through to other peers. If these keep-alive messages could be sent successfully (YES), the high-availability manager considers itself as OK 4654. If these keep-alive messages could not be sent (NO), the high-availability manager considers its SCM as having a potential failure 4643.

Because IB allows peer memory visibility through specialized hardware, for example IB host channel adapters (HCA), all CPUs such as the NSPs, the ASPs and the Management Service processors can be connected to LDTF. In one embodiment of the invention, pre-allocated local memory buffers can store the shared data structures of each process and DMA can be initiated and completed directly by host channel adapters, which frees up the CPUs. Update and synchronization can be done periodically or event based. The benefit is that it can eliminate multiple memory-to-memory data copies, and that the transport protocol stack can be bypassed to reduce protocol overhead and reduce the cost of context switches. The virtual lane feature of IB allows multiple virtual lanes to be used, for example, one or more management lanes and one or more data lanes. In one embodiment of the invention, virtual lanes can be used to provide prioritized channels for high-availability traffic as well as making multiple logical links available over one single physical link. In another embodiment of the invention, virtual lanes also can be used to prioritize traffic through service links to virtual lane. In yet another embodiment of the invention, virtual lanes can be used for one single management link over the same physical link, for example, to perform health checks, or transmit monitoring information, or to send high-availability handshakes while leaving other virtual lanes open for ISO Layer-4 to ISO Layer-7 state replication and transport protocol stream replication.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   in response to receiving at a first network element a packet of a network transaction from a client over a first network for accessing a server of a datacenter having a plurality of servers over a second network, performing a layer 2 network process on the packet and generating a data stream within the first network element;
   performing a layer-3 handshaking with a second network element via a lossless interconnect link coupling the first network element and the second network element;
   replicating the data stream to the second network element via the lossless interconnect link to synchronize layer-4 states between the first network element and the second network element and to enable the second network element to perform higher layer processes on the data stream with respect to the network transaction to obtain connection states of the network transaction;
   wherein the second network element is configured to operate as a redundant peer to the first network element; and
   wherein in response to a failure of the first network element, the second network element is configured to take over processes of the network transaction from the first network element using the obtained connection states without user interaction of the client.

2. The method of claim 1, wherein performing comprises performing the layer-3 handshaking with the second network element via the lossless interconnect link that is implemented using one of a remote direct memory access (RDMA) compatible technology, an InfiniBand compatible technology and a lossless interconnect.

3. The method of claim 1, further comprising:
   performing layer 5-7 processes on the packet within the first network element to obtain layer 5-7 connection states of the network transaction;
   storing the layer 5-7 connection states in a first memory of the first network element; and
   synchronizing the layer 5-7 connection states with the second network element by synchronizing at least a portion of content of the first memory of the first network element and at least a portion of content of a second memory of a second network element via a predetermined low latency lossless interconnect link.

4. The method of claim 3, wherein synchronizing comprises synchronizing the first memory of the first network element and the second memory of the second network element via one of a remote direct memory access (RDMA) compatible technology and a lossless fabric.

5. The method of claim 4, further comprising exposing at least a portion of the first memory of the first network element to the second network element such that the second network element configured to read content of the portion of first memory of the first network that is exposed to obtain the layer 5-7 connection states.

6. The method of claim 5, wherein exposing comprises exposing the portion of the first memory of the first network element such that the portion of the first memory is read by the second network element via an RDMA channel without involving significant processing power from the first network element.

7. The method of claim 5, further comprising directly accessing at the second network element the portion of the first memory that is exposed via an RDMA channel bypassing a transport control protocol (TCP) network stack of the first network element.

8. The method of claim 1, further comprising configuring the second network element to monitor a health of the first network element via a dedicated monitoring channel over the lossless interconnect link to determine whether the first network element is operating properly, and if it is determined that the first network element fails to operate properly, configuring the second network element to transparently take over the network processes of the network transaction using the obtained connection states without acknowledgment from the client.

9. A machine-readable storage medium having instructions stored therein, which when executed by a processor, cause the processor to:
in response to receiving at a first network element a packet of a network transaction from a client over a first network for accessing a server of a datacenter having a plurality of servers over a second network, perform a layer 2 network process on the packet and generating a data stream within the first network element;
perform a layer-3 handshaking with a second network element via a lossless interconnect link coupling the first network element and the second network element; and
replicate the data stream to the second network element via the lossless interconnect link to synchronize layer-4 states between the first network element and the second network element and to enable the second network element to perform higher layer processes on the data stream with respect to the network transaction to obtain connection states of the network transaction, wherein the second network element is configured to operate as a redundant peer to the first network element, and wherein in response to a failure of the first network element, the second network element is configured to take over processes of the network transaction from the first network element using the obtained connection states without user interaction of the client.

10. The machine-readable storage medium of claim 9, wherein the instructions that cause the processor to perform the layer-3 handshaking with the second network element comprise instructions that cause the processor to perform the layer-3 handshaking with the second network element via the lossless interconnect link is implemented using one of a remote direct memory access (RDMA) and capable compatible technology, an InfiniBand compatible technology.

11. The machine-readable storage medium of claim 9, further comprising instructions that cause the processor to:
perform layer 5-7 processes on the packet within the first network element to obtain layer 5-7 connection states of the network transaction;
store layer 5-7 connection states in a first memory of the first network element; and
synchronize the layer 5-7 connection states with the second network element by synchronizing at least a portion of content of the first memory of the first network element and at least a portion of content of a second memory of a second network element via a predetermined low latency lossless interconnect link.

12. The machine-readable storage medium of claim 11, wherein the instructions that cause the processor to synchronize the layer 5-7 connection states comprise instructions that cause the processor to synchronize the first memory of the first network element and the second memory of the second network element via one of a remote direct memory access (RDMA) compatible technology and a lossless fabric.

13. The machine-readable storage medium of claim 12, further comprising instructions that cause the processor to expose at least a portion of the first memory of the first network element to the second network element such that the second network element is able to read content of the a portion of first memory of the first network that is exposed to obtain the layer 5-7 connection states.

14. The machine-readable storage medium of claim 13, wherein the instructions that cause the processor to expose at least a portion of the first memory comprise instructions that cause the processor to expose the portion of the first memory of the first network element such that the portion of the first memory is read by the second network element via an RDMA channel without involving significant processing power from the first network element.

15. The machine-readable storage medium of claim 13, further comprising instructions that cause the processor to directly access at the second network element the portion of the first memory that is exposed via an RDMA channel bypassing a transport control protocol (TCP) network stack of the first network element.

16. The machine-readable storage medium of claim 9, further comprising instructions that cause the processor to configure the second network element to monitor a health of the first network element via a dedicated monitoring channel over the lossless interconnect link to determine whether the first network element is operating properly, and if it is determined that the first network element fails to operate properly, configure the second network element to transparently take over the network processes of the network transaction using the obtained connection states without acknowledgment from the client.

17. An apparatus, comprising:
at least a first network interface coupled to a switch fabric;
a processor configured to be coupled to the first network interface and configured to perform network service operations comprising:
in response to receiving a packet of a network transaction at the first network interface from a client over a first network for accessing a server of a datacenter having a plurality of servers over a second network, executing a layer 2 process on the packet to generate a data stream;
executing a layer 3 handshaking procedure over a lossless interconnect coupled with a second network apparatus;

wherein replicating the data stream and sending the data stream to the second network apparatus as a redundant peer via the lossless interconnect link to synchronize layer-4 states with the redundant peer, enable the redundant peer to perform higher layer processes on the data stream to obtain connection states of the network transaction; and in response to a failure, configuring the redundant peer to take over network processes of the network transaction using the obtained connection states without user interaction from the client.

18. The apparatus of claim 17, wherein the processor is configured to execute the layer 3 handshaking over the lossless interconnect link using one of a remote direct memory access (RDMA) compatible technology and an InfiniBand compatible technology.

19. The apparatus of claim 17, wherein the processor is further configured to execute network service operations comprising:

layer 5-7 processing on the packet to obtain layer 5-7 connection states of the network transaction;

storing the layer 5-7 connection states in a first memory; and synchronizing the layer 5-7 connection states with the redundant peer by synchronizing at least a portion of content of the first memory and at least a portion of content of a second memory of the redundant peer via the low latency lossless interconnect link.

20. The apparatus of claim 19, wherein the processor is configured to synchronize the first memory and the second memory of the redundant peer via one of a remote direct memory access (RDMA) compatible technology and an InfiniBand compatible technology.

21. A system comprising the apparatus of claim 20, wherein a processor of the redundant peer is configured to read content of at least a portion of the first memory that is exposed to the redundant peer to obtain the layer 5-7 connection states.

22. The system of claim 21, wherein the processor of the redundant peer is configured to read the first memory via an RDMA channel without involving significant processing power from the network element.

23. The system of claim 21, wherein the processor of the redundant peer is configured to directly access the first memory that is exposed via an RDMA channel bypassing a transport control protocol (TCP) network stack of the network element.

24. A system comprising the apparatus of claim 17, wherein a processor of the redundant peer is configured monitor a health of the apparatus via a dedicated monitoring channel over the lossless interconnect link to determine whether the apparatus is operating properly, and wherein if it is determined that the apparatus fails to operate properly, the processor of the redundant peer is configured to transparently take over the network processes of the network transaction using the obtained connection states without acknowledgment from the client.

* * * * *